United States Patent [19]
Gottstein

[11] Patent Number: 6,115,697
[45] Date of Patent: Sep. 5, 2000

[54] COMPUTERIZED SYSTEM AND METHOD FOR OPTIMIZING AFTER-TAX PROCEEDS

[75] Inventor: David Richard Gottstein, Anchorage, Ak.

[73] Assignee: Dynamic Research Group, Anchorage, Ak.

[21] Appl. No.: 09/253,453

[22] Filed: Feb. 19, 1999

[51] Int. Cl.[7] .................................................. G06F 17/00
[52] U.S. Cl. ............................................... 705/35; 705/36
[58] Field of Search ................................. 705/35–37, 39, 705/31

[56] References Cited

U.S. PATENT DOCUMENTS

| | | |
|---|---|---|
| 4,566,066 | 1/1986 | Towers . |
| 4,739,478 | 4/1988 | Roberts et al. . |
| 5,590,037 | 12/1996 | Ryan et al. . |
| 5,749,077 | 5/1998 | Campbell . |
| 5,761,441 | 6/1998 | Bennett . |
| 5,802,501 | 9/1998 | Graff . |
| 5,806,048 | 9/1998 | Kiron . |
| 5,806,049 | 9/1998 | Petruzzi . |
| 5,852,811 | 12/1998 | Atkins . |
| 5,864,828 | 1/1999 | Atkins . |
| 5,893,079 | 4/1999 | Cwenar ...................................... 705/36 |
| 5,978,778 | 11/1999 | O'Shaughnessy ......................... 705/36 |
| 5,987,433 | 11/1999 | Crapo ........................................ 705/36 |

OTHER PUBLICATIONS

Price, Lee N. "Maximizing and Reporting a Portfolio's After–Tax Performance" Trusts and Estates, 136, n. 3, 55(5), Feb. 1997.

Stein, David M. "Measuring and Evaluating Portfolio Performance After Taxes" Journal of Portfolio Management v24 n2 p117(8), Wntr 1998.

Apelfeld et al. "Tax–Aware Equity Investing" Journal of Portfolio Management v22 n2 p18(11), 1996.

Brunel, Jean L.P. "The Upside–Down World of Tax–Aware Investing" Trusts and Estates 136, n3 34(8), Feb. 1997.

PR Newswire Prudential Introduces the Prudential Tax–Managed Equity Fund, Jan. 1999.

*Primary Examiner*—Melanie A. Kemper
*Attorney, Agent, or Firm*—Brown Raysman Millstein Felder & Steiner LLP

[57] ABSTRACT

A computerized system and method process financial securities and instruments to accurately determine and optimize the after-tax proceeds an investor could expect to have at the end of a holding period for each of a set of investment strategies and determines an optimal strategy for maximizing such after-tax proceeds. The computerized system and method receive tax and investment data, user-customized investment expectations, and financial adviser-based investment expectations at a processor; perform tax loss harvesting analysis on the user-customized investment expectations and the financial adviser-based investment expectations over a dynamic taxation time range using a predetermined software program; perform comparative pro-forma tax sensitivity analysis of the tax and investment data and the analyzed investment expectations using the predetermined software program; and determine and output an optimal after-tax investment strategy path from a plurality of investment strategy paths over the dynamic taxation time range using the predetermined software program to optimize the after-tax proceeds from the plurality of investment strategies. The predetermined software program may include a spreadsheet program.

26 Claims, 19 Drawing Sheets

FIG. 3A

| | AK | AL | AM | AN | AO | AP |
|---|---|---|---|---|---|---|
| 549 | CLIENT INPUT CUSTOMIZATION WINDOW | | | | | |
| 550 | | | | | | |
| 551 | DRG TAX ANALYSIS FOR | | | | SUBJECTIVITY ASSUMPTIONS | |
| 552 | COCA-COLA COMPANY | 01:37 PM | 01-Feb | DRG SYSTEM DEFAULTS | | CLIENT CUSTOM ASSUMPTIONS |
| 553 | INPUTS | | | | | |
| 554 | | | | | | |
| 555 | | | | | | |
| 556 | COMPANY GENERAL INPUTS | | | | | |
| 557 | CURRENT PRICE | | | $65.56 | | $65.56 |
| 558 | EARNINGS BASE | | | $1.63 | | $1.63 |
| 559 | FIVE YEAR EARNINGS GROWTH RATE | | | 16.0% | | 16.0% |
| 560 | LONG TERM P.E. TARGET | | | 27.0 | | 27.0 |
| 561 | FIVE YEAR PRICE TARGET | | | $92.39 | | $92.39 |
| 562 | PORTFOLIO TURNOVER | | | 50% | | 50% |
| 563 | | | | | | |
| 564 | | | | | | |
| 565 | CURRENT HIGHEST JUSTIFIABLE PRICE | | | $64.71 | | $64.71 |
| 566 | SUPPORTABLE DIVIDEND YIELD | | | 0.9% | | 0.9% |
| 567 | DIVIDEND GROWTH RATE ASSUMPTION | | | 10.0% | | 10.0% |
| 568 | SHORT TERM REALIZED GAINS | | | $0 | | $0 |
| 569 | MARGINAL ORDINARY TAX RATE | | | 39.6% | | 39.6% |
| 570 | 12 MONTH CAPITAL GAINS TAX RATE | | | 20.0% | | 20.0% |
| 571 | LONG TERM REALIZED GAINS | | | $0 | | $0 |
| 572 | OTHER INCOME OFFSET AVAIL. | | | $3,000 | | $3,000 |
| 573 | NUMBER OF SHARES | | | 100 | | 100 |
| 574 | NON-ADJUSTED TOTAL COST OF LOT | | | $4,500 | | $4,500 |
| 575 | MONTHS UNTIL LOWEST TAX BRACKET | | | 1 | | 1 |
| 576 | ADJUSTED TOTAL COST OF LOT | | | $4,500 | | $4,500 |
| 577 | MIN BEF TAX ACTIVE REINVESTMENT ASSUMPTION | | | 11.3% | | 11.3% |
| 578 | S&P DIVIDEND ASSUMPTION | | | 1.8% | | 1.8% |
| 579 | S&P EARNINGS&DIV GROWTH ASSUMPTION | | | 9% | | 9% |
| 580 | S&P LONG TERM PE ASSUMPTION | | | 19.1 | | 19.1 |
| 581 | | | | | | |
| 582 | ANNUAL ADVISOR FEE | | | 1.0% | | 1.0% |
| 583 | BROKERAGE ANNUAL WRAP FEE | | | 1.0% | | 1.0% |
| 584 | BROKERAGE CENTS/SHARE | | | $0.00 | | $0.00 |

| | CM | CN | CO | CP | CQ | CR |
|---|---|---|---|---|---|---|
| 1 | DYNAMIC TAX LOGIC WEBSITE SUPPORT DOCUMENT | | CM1..CS283 | | | |
| 2 | INVESTMENT WORKSTATION IV INPUT/OUTPUT DETAIL | | LOC. | OUTPUT | RANGE NAME | |
| 3 | (DTL INPUT/OUTPUT DISPLAYS AK547..AQ647)(ADVANCED ANAL. DISPLAYS CM284..CS398) | | | | | |
| 4 | DCM FACT SETS (OVERWRITE DCM FACTS W/CUSTOMER FACTS) | | | | | |
| 5 | DCM ANNUAL ADVISOR FEE | | AN582 | | DCM_ADV_FEE | |
| 6 | DCM BROKERAGE ANNUAL WRAP FEE | | AN583 | | DCM_WRAP_FEE | |
| 7 | DCM BROKERAGE CENTS/SHARE | | AN584 | | DCM_CENTS_SH | |
| 8 | DCM SHORT TERM TAX RATE | | AN569 | | DCM_MARG_RATE | |
| 9 | DCM LONG TERM TAX RATE | | AN570 | | DCM_LT_RATE | |
| 10 | DCM NUMBER OF SHARES | | AN573 | | DCM_SHARES | |
| 11 | DCM COST OF LOT | | AN574 | | DCM_LOT_COST | |
| 12 | DCM MONTHS UNTIL LONG TERM | | AN575 | | DCM_MONTHS | |
| 13 | DCM SHORT TERM REALIZED CAPITAL GAINS/LOSSES | | AN568 | | DCM_ST_LOSS | |
| 14 | DCM LONG TERM REALIZED CAPITAL GAINS/LOSSES | | AN571 | | DCM_LT_LOSS | |
| 15 | DCM OTHER INCOME OFFSET AVAILABLE | | AN572 | | DCM_OFFSET | |
| 16 | CUSTOMER FACT SETS | | | | | |
| 17 | CUSTOMER ANNUAL ADVISOR FEE | | AP582 | | CUST_ADV_FEE | |
| 18 | CUSTOMER BROKERAGE ANNUAL WRAP FEE | | AP583 | | CUST_WRAP_FEE | |
| 19 | CUSTOMER BROKERAGE CENTS/SHARE | | AP584 | | CUST_CENTS_SH | |
| 20 | CUSTOMER SHORT TERM TAX RATE | | AP569 | | CUST_MARG_RATE | |
| 21 | CUSTOMER LONG TERM TAX RATE | | AP570 | | CUST_LT_RATE | |
| 22 | CUSTOMER NUMBER OF SHARES | | AP573 | | CUST_SHARES | |
| 23 | CUSTOMER COST OF LOT | | AP574 | | CUST_LOT_COST | |
| 24 | CUSTOMER MONTHS UNTIL LONG TERM | | AP575 | | CUST_MONTHS | |
| 25 | CUSTOMER SHORT TERM REALIZED CAPITAL GAINS/LOSSES | | AP568 | | CUST_ST_LOSS | |
| 26 | CUSTOMER LONG TERM REALIZED CAPITAL GAINS/LOSSES | | AP571 | | CUST_LT_LOSS | |
| 27 | CUST OTHER INCOME OFFSET AVAILABLE | | AP572 | | CUST_OFFSET | |

FIG. 3B

|    |                                                      |       |         |                  |
|----|------------------------------------------------------|-------|---------|------------------|
| 28 | CUSTOMER EXPECTATION INPUTS                          |       |         |                  |
| 29 | CUSTOMER PRICE                                       | AP557 |         | CUST_PRICE       |
| 30 | CUSTOMER EARNINGS BASE                               | AP558 |         | CUST_E_BASE      |
| 31 | CUSTOMER 5 YR GROWTH RATE                            | AP559 |         | CUST_E_GROW      |
| 32 | CUSTOMER L.T. P.E. TARGET                            | AP560 |         | CUST_PE_TARG     |
| 33 | CUSTOMER PRICE TARGETING CODE                        | AQ561 |         | CUST_PTARG_CODE  |
| 34 | CUSTOMER PRICE BASED TARGET (IF APPLICABLE)          | AR561 |         | CUST_STATIC_TAR  |
| 35 | CUSTOMER PORTFOLIO TURNOVER                          | AP562 |         | CUST_TURNOVER    |
| 36 | CUSTOMER CURRENT HIGHEST JUSTIFIABLE PRICE           | AP565 |         | CUST_HIGHEST_P   |
| 37 | CUSTOMER SUPPORTABLE DIVIDEND YIELD                  | AP566 |         | CUST_SUP_STKDIV  |
| 38 | CUSTOMER DIVIDEND GROWTH RATE                        | AP567 |         | CUST_DIV_GROW    |
| 39 | CUSTOMER BEFORE TAX REINVESTMENT RATE ASSUMPTION     | AP577 |         | CUST_REINVEST    |
| 40 | CUSTOMER S&P DIVIDEND ASSUMPTION                     | AP578 |         | CUST_SP_DIV      |
| 41 | CUSTOMER S&P EARNINGS GROWTH RATE ASSUMPTION         | AP579 |         | CUST_SP_GROW     |
| 42 | CUSTOMER S&P LONG TERM P.E. ASSUMPTION               | AP580 |         | CUST_SP_PE       |
| 43 |                                                      |       |         |                  |
| 44 | DCM LOT ANALYSIS RESULTS OUTPUT                      |       |         |                  |
| 45 | DCM FIVE YEAR TARGET PRICE                           | CP45  | $92.39  | DCM_5YR_PRICE    |
| 46 | DCM NEW PURCHASE 5 YEAR NON-TAXABLE RETURN POTENTIAL | CP46  | 8.1%    | DCM_NT_RET_POT   |
| 47 | DCM NEW PURCHASE 5 YEAR AFTER TAX RETURN POTENTIAL   | CP47  | 4.4%    | DCM_AT_RET_POT   |
| 48 | DCM EXISTING LOT 5 YR AFTER TAX RETURN POTENTIAL     | CP48  | 6.1%    | DCM_LOT_AT_RET   |
| 49 | DCM S&P 5 YR CAPITAL APPRECIATION POTENTIAL          | CP49  | 5.5%    | DCM_SP_CAP_AP    |
| 50 | DCM COST PER SHARE                                   | CP50  | $45.00  | DCM_COST_SHARE   |
| 51 | DCM SIMPLE RETURN                                    | CP51  | 46%     | DCM_SIMPLE_RET   |
| 52 | DCM CURRENT MARKET VALUE                             | CP52  | $6,556  | DCM_CUR_MKTVAL   |
| 53 | DCM CURRENT MARKET VALUE (AFTER TAX)                 | CP53  | $5,742  | DCM_CUR_AT_VAL   |
| 54 | DCM EFFECTIVE CAPITAL GAINS TAX RATE                 | CP54  | 20%     | DCM_EFFTAXRATE   |
| 55 | DCM STOCK SUPPORTABLE DIVIDEND YIELD                 | CP55  | 0.9%    | DCM_STK_DIVYLD   |

FIG. 3C

| | CM | CN | CO | CP | CQ | CR |
|---|---|---|---|---|---|---|
| 56 | DCM CURRENT STOCK CAPITAL GAINS TAX RATE | | CP56 | 39.6% | DCM_CURCAP | RATE |
| 57 | DCM THREE YEAR HORIZON OPTIMIZING RECOMMENDATION | | CP57 | SELL LON | DCM_3YR_REC | |
| 58 | DCM FOUR YEAR HORIZON OPTIMIZING RECOMMENDATION | | CP58 | SELL LON | DCM_4YR_REC | |
| 59 | DCM FIVE YEAR HORIZON OPTIMIZING RECOMMENDATION | | CP59 | SELL LON | DCM_5YR_REC | |
| 60 | DCM 3YR NEW PURCHASE AFTER-TAX VALUE | | CP60 | $7,459 | DCM_3YRNEW_VAL | |
| 61 | DCM 4YR NEW PURCHASE AFTER-TAX VALUE | | CP61 | $7,810 | DCM_4YRNEW_VAL | |
| 62 | DCM 5YR NEW PURCHASE AFTER-TAX VALUE | | CP62 | $8,114 | DCM_5YRNEW_VAL | |
| 63 | DCM 3YR HOLD AFTER_TAX VALUE | | CP63 | $7,048 | DCM_3YRHOLD_VAL | |
| 64 | DCM 4YR HOLD AFTER_TAX VALUE | | CP64 | $7,399 | DCM_4YRHOLD_VAL | |
| 65 | DCM 5YR HOLD AFTER_TAX VALUE | | CP65 | $7,703 | DCM_5YRHOLD_VAL | |
| 66 | DCM 3YR SELL NOW ACTIVE AFTER_TAX VALUE | | CP66 | $6,552 | DCM_3YR_SN_ACTV | |
| 67 | DCM 4YR SELL NOW ACTIVE AFTER_TAX VALUE | | CP67 | $7,037 | DCM_4YR_SN_ACTV | |
| 68 | DCM 5YR SELL NOW ACTIVE AFTER_TAX VALUE | | CP68 | $7,880 | DCM_5YR_SN_ACTV | |
| 69 | DCM 3YR SELL NOW PASSIVE AFTER_TAX VALUE | | CP69 | $5,864 | DCM_3YR_SN_PASV | |
| 70 | DCM 4YR SELL NOW PASSIVE AFTER_TAX VALUE | | CP70 | $6,054 | DCM_4YR_SN_PASV | |
| 71 | DCM 5YR SELL NOW PASSIVE AFTER_TAX VALUE | | CP71 | $6,848 | DCM_5YR_SN_PASV | |
| 72 | DCM 3YR SELL LONG TERM ACTIVE AFTER_TAX VALUE | | CP72 | $7,467 | DCM_3YR_SL_ACTV | |
| 73 | DCM 4YR SELL LONG TERM ACTIVE AFTER_TAX VALUE | | CP73 | $7,998 | DCM_4YR_SL_ACTV | |
| 74 | DCM 5YR SELL LONG TERM ACTIVE AFTER_TAX VALUE | | CP74 | $8,433 | DCM_5YR_SL_ACTV | |
| 75 | DCM 3YR SELL LONG TERM PASSIVE AFTER_TAX VALUE | | CP75 | $6,685 | DCM_3YR_SL_PASV | |
| 76 | DCM 4YR SELL LONG TERM PASSIVE AFTER_TAX VALUE | | CP76 | $6,895 | DCM_4YR_SL_PASV | |
| 77 | DCM 5YR SELL LONG TERM PASSIVE AFTER_TAX VALUE | | CP77 | $7,266 | DCM_5YR_SL_PASV | |
| 78 | DCM MAXIMUM 3YR STRATEGY VALUE | | CP78 | $7,467 | DCM_3YR_MAXVAL | |
| 79 | DCM MAXIMUM 4YR STRATEGY VALUE | | CP79 | $7,998 | DCM_4YR_MAXVAL | |
| 80 | DCM MAXIMUM 5YR STRATEGY VALUE | | CP80 | $8,433 | DCM_5YR_MAXVAL | |
| 81 | DCM PRICE | | CP81 | 65.56 | DCM_STOCK_PRICE | |
| 82 | DCM EARNINGS BASE | | CP82 | $1.63 | DCM_E_BASE | |

FIG. 3D

|    |                                                          |       |         |                |
|----|----------------------------------------------------------|-------|---------|----------------|
| 83 | DCM 5 YR GROWTH RATE                                     | CP83  | 16.0%   | DCM_E_GROW     |
| 84 | DCM L.T. P.E. TARGET                                     | CP84  | 27.0    | DCM_PE_TARG    |
| 85 | DCM PORTFOLIO TURNOVER                                   | CP85  | 50%     | DCM_TURNOVER   |
| 86 | DCM CURRENT HIGHEST JUSTIFIABLE PRICE                    | CP86  | $64.71  | DCM_HIGHEST_P  |
| 87 | DCM SUPPORTABLE DIVIDEND YIELD                           | CP87  | 0.9%    | R_SUP_DIV      |
| 88 | DCM DIVIDEND GROWTH RATE                                 | CP88  | 10.0%   | DCM_DIV_GROW   |
| 89 | DCM BEFORE TAX REINVESTMENT RATE ASSUMPTION              | CP89  | 11.3%   | DCM_REINVEST   |
| 90 | DCM S&P DIVIDEND ASSUMPTION                              | CP90  | 1.8%    | DCM_SP_DIV     |
| 91 | DCM S&P EARNINGS GROWTH RATE ASSUMPTION                  | CP91  | 9.0%    | DCM_SP_GROW    |
| 92 | DCM S&P LONG TERM P.E. ASSUMPTION                        | CP92  | 19.1    | DCM_SP_PE      |
| 93 | DCM DAY 365 AFTER TAX VALUE                              | CP93  | $5,765  | DCM_D365_ATVAL |
| 94 | DCM DAY 366 AFTER TAX VALUE                              | CP94  | $6,175  | DCM_D366_ATVAL |
| 95 | DCM 3YR TAX LOSS HARVEST SHARES/MATCHING OFFSET          | CP95  | 0       | DCM_TLH_3MATSH |
| 96 | DCM 3YR TAX LOSS HARVEST SHARES/ALTERNATE OFFSET         | CP96  | 0       | DCM_TLH_3ALTSH |
| 97 | DCM 4YR TAX LOSS HARVEST SHARES/MATCHING OFFSET          | CP97  | 0       | DCM_TLH_4MATSH |
| 98 | DCM 4YR TAX LOSS HARVEST SHARES/ALTERNATE OFFSET         | CP98  | 0       | DCM_TLH_4ALTSH |
| 99 | DCM 5YR TAX LOSS HARVEST SHARES/MATCHING OFFSET          | CP99  | 0       | DCM_TLH_5MATSH |
| 100| DCM 5YR TAX LOSS HARVEST SHARES/ALTERNATE OFFSET         | CP100 | 0       | DCM_TLH_5ALTSH |
| 101|                                                          |       |         |                |
| 102|                                                          |       |         |                |
| 103|                                                          |       |         |                |
| 104|                                                          |       |         |                |
| 105|                                                          |       |         |                |
| 106|                                                          |       |         |                |
| 107|                                                          |       |         |                |
| 108|                                                          |       |         |                |
| 109| CUSTOMER LOT ANALYSIS RESULTS OUTPUT                     |       |         |                |
| 110|                                                          |       |         |                |

FIG. 3E

| A | CM | CN | CO | CP | CQ | CR |
|---|---|---|---|---|---|---|
| 111 | CUST FIVE YEAR TARGET PRICE | | CP111 | $92.39 | CUST5YR_PRICE | |
| 112 | CUST NEW PURCHASE 5 YEAR NON-TAXABLE RETURN POTENTIAL | | CP112 | 8.1% | CUSTNT_RET_POT | |
| 113 | CUST NEW PURCHASE 5 YEAR AFTER TAX RETURN POTENTIAL | | CP113 | 4.4% | CUSTAT_RET_POT | |
| 114 | CUST EXISTING LOT 5 YR AFTER TAX RETURN POTENTIAL | | CP114 | 6.1% | CUSTLOT_AT_RET | |
| 115 | CUST S&P 5 YR CAPITAL APPRECIATION POTENTIAL | | CP115 | 5.5% | CUSTSP_CAP_AP | |
| 116 | CUST COST PER SHARE | | CP116 | $45.00 | CUSTCOST_SHARE | |
| 117 | CUST SIMPLE RETURN | | CP117 | 46% | CUSTSIMPLE_RET | |
| 118 | CUST CURRENT MARKET VALUE | | CP118 | $6,556 | CUSTCUR_MKTVAL | |
| 119 | CUST CURRENT MARKET VALUE (AFTER TAX) | | CP119 | $5,742 | CUSTCUR_AT_VAL | |
| 120 | CUST EFFECTIVE CAPITAL GAINS TAX RATE | | CP120 | 20% | CUSTEFFTAXRATE | |
| 121 | CUST STOCK SUPPORTABLE DIVIDEND YIELD | | CP121 | 0.9% | CUSTSTK_DIVYLD | |
| 122 | CUST CURRENT STOCK CAPITAL GAINS TAX RATE | | CP122 | 39.6% | CUSTCURCAPRATE | |
| 123 | CUST THREE YEAR HORIZON OPTIMIZING RECOMMENDATION | | CP123 | SELL LON | CUST3YR_REC | |
| 124 | CUST FOUR YEAR HORIZON OPTIMIZING RECOMMENDATION | | CP124 | SELL LON | CUST4YR_REC | |
| 125 | CUST FIVE YEAR HORIZON OPTIMIZING RECOMMENDATION | | CP125 | SELL LON | CUST5YR_REC | |
| 126 | CUST 3YR NEW PURCHASE AFTER-TAX VALUE | | CP126 | $7,459 | CUST3YRNEW_VAL | |
| 127 | CUST 4YR NEW PURCHASE AFTER-TAX VALUE | | CP127 | $7,810 | CUST4YRNEW_VAL | |
| 128 | CUST 5YR NEW PURCHASE AFTER-TAX VALUE | | CP128 | $8,114 | CUST5YRNEW_VAL | |
| 129 | CUST 3YR HOLD AFTER_TAX VALUE | | CP129 | $7,048 | CUST3YRHOLD_VAL | |
| 130 | CUST 4YR HOLD AFTER_TAX VALUE | | CP130 | $7,399 | CUST4YRHOLD_VAL | |
| 131 | CUST 5YR HOLD AFTER_TAX VALUE | | CP131 | $7,703 | CUST5YRHOLD_VAL | |
| 132 | CUST 3YR SELL NOW ACTIVE AFTER_TAX VALUE | | CP132 | $6,552 | CUST3YR_SN_ACTV | |
| 133 | CUST 4YR SELL NOW ACTIVE AFTER_TAX VALUE | | CP133 | $7,037 | CUST4YR_SN_ACTV | |
| 134 | CUST 5YR SELL NOW ACTIVE AFTER_TAX VALUE | | CP134 | $7,880 | CUST5YR_SN_ACTV | |
| 135 | CUST 3YR SELL NOW PASSIVE AFTER_TAX VALUE | | CP135 | $5,864 | CUST3YR_SN_PASV | |
| 136 | CUST 4YR SELL NOW PASSIVE AFTER_TAX VALUE | | CP136 | $6,054 | CUST4YR_SN_PASV | |

FIG. 3F

|  | | | |
|---|---|---|---|
| 137 | CUST 5YR SELL NOW PASSIVE AFTER_TAX VALUE | CP137 | $6,848 CUST5YR_SN_PASV |
| 138 | CUST 3YR SELL LONG TERM ACTIVE AFTER_TAX VALUE | CP138 | $7,467 CUST3YR_SL_ACTV |
| 139 | CUST 4YR SELL LONG TERM ACTIVE AFTER_TAX VALUE | CP139 | $7,998 CUST4YR_SL_ACTV |
| 140 | CUST 5YR SELL LONG TERM ACTIVE AFTER_TAX VALUE | CP140 | $8,433 CUST5YR_SL_ACTV |
| 141 | CUST 3YR SELL LONG TERM PASSIVE AFTER_TAX VALUE | CP141 | $6,685 CUST3YR_SL_PASV |
| 142 | CUST 4YR SELL LONG TERM PASSIVE AFTER_TAX VALUE | CP142 | $6,895 CUST4YR_SL_PASV |
| 143 | CUST 5YR SELL LONG TERM PASSIVE AFTER_TAX VALUE | CP143 | $7,266 CUST5YR_SL_PASV |
| 144 | CUST MAXIMUM 3YR STRATEGY VALUE | CP144 | $7,467 CUST3YR_MAXVAL |
| 145 | CUST MAXIMUM 4YR STRATEGY VALUE | CP145 | $7,998 CUST4YR_MAXVAL |
| 146 | CUST MAXIMUM 5YR STRATEGY VALUE | CP146 | $8,433 CUST5YR_MAXVAL |
| 147 | BUY/SELL SREEN CUSTOMER RESULTS OUTPUTS | | |
| 148 | NON-TAXABLE THREE YEAR HOLD RETURN | CP148 | 2.8% BS_3YR_NT_RET |
| 149 | NON-TAXABLE FOUR YEAR HOLD RETURN | CP149 | 3.5% BS_4YR_NT_RET |
| 150 | NON-TAXABLE FIVE YEAR HOLD RETURN | CP150 | 6.0% BS_5YR_NT_RET |
| 151 | TAXABLE THREE YEAR HOLD RETURN | CP151 | 7.1% BS_3YR_T_RET |
| 152 | TAXABLE FOUR YEAR HOLD RETURN | CP152 | 6.5% BS_4YR_T_RET |
| 153 | TAXABLE FIVE YEAR HOLD RETURN | CP153 | 6.1% BS_5YR_T_RET |
| 154 | CUSTOMER DAY 365 AFTER TAX VALUE | CP154 | $5,765 CUST_D365_ATVAL |
| 155 | CUSTOMER DAY 366 AFTER TAX VALUE | CP155 | $6,175 CUST_D366_ATVAL |
| 156 | CUST 3YR TAX LOSS HARVEST SHARES/MATCHING OFFSET | CP156 | 0 CUST_TLH_3MATSH |
| 157 | CUST 3YR TAX LOSS HARVEST SHARES/ALTERNATE OFFSET | CP157 | 0 CUST_TLH_3ALTSH |
| 158 | CUST 4YR TAX LOSS HARVEST SHARES/MATCHING OFFSET | CP158 | 0 CUST_TLH_4MATSH |
| 159 | CUST 4YR TAX LOSS HARVEST SHARES/ALTERNATE OFFSET | CP159 | 0 CUST_TLH_4ALTSH |
| 160 | CUST 5YR TAX LOSS HARVEST SHARES/MATCHING OFFSET | CP160 | 0 CUST_TLH_5MATSH |
| 161 | CUST 5YR TAX LOSS HARVEST SHARES/ALTERNATE OFFSET | CP161 | 0 CUST_TLH_5ALTSH |
| 162 | | | |

FIG. 3G

|   | A | B | C | D | E | F |
|---|---|---|---|---|---|---|
| 690 | DCM SELL LONG TERM REINVEST ACTIVE | | | CUST SELL LONG TERM REINVEST ACTIVE | | |
| 691 | FIRST YEAR | | | FIRST YEAR | | |
| 692 | COST | | $4,500 | COST | | $4,500 |
| 693 | MO. OWNED YR 1 | | 1 | M.T. OWNED YR 1 | | 1 |
| 694 | LONG TERM WINDOW MKT VALUE | | $6,594 | LONG TERM WINDOW MKT V | | $6,594 |
| 695 | HOLD CAP APP UNTIL L.T. WINDOW | | $38 | HOLD CAP APP UNTIL L.T. WI | | $38 |
| 696 | REINVEST CAP APP. YR 1 | | $536 | REINVEST CAP APP. YR 1 | | $536 |
| 697 | CURR. MO. | | 0.6% | CURR. MO. | | 0.6% |
| 698 | SELL AT L.T. TAXABLE GAIN | | $2,094 | SELL AT L.T. TAXABLE GAIN | | $2,094 |
| 699 | TAXABLE REINVEST GAINS | | $268 | TAXABLE REINVEST GAINS | | $268 |
| 700 | DAY 365 AFTER TAX VALUE | | $5,765 | DAY 365 AFTER TAX VALUE | | $5,765 |
| 701 | DAY 366 AFTER TAX VALUE | | $6,175 | DAY 366 AFTER TAX VALUE | | $6,175 |

© Copyright 1999 DYNAMIC RESEARCH GROUP

FIG. 4A

| | G | H | I | J | K | L |
|---|---|---|---|---|---|---|
| 690 | DCM SELL LONG TERM REINVEST PASSIVE | | | CUST SELL LONG TERM REINVEST PASSIVE | | |
| 691 | FIRST YEAR | | | FIRST YEAR | | |
| 692 | COST | | $4,500 | COST | | $4,500 |
| 693 | MO. OWNED YR 1 | | 1 | MO. OWNED YR 1 | | 1 |
| 694 | LONG TERM WINDOW MKT VAL | | $6,594 | LONG TERM WINDOW MKT V | | $6,594 |
| 695 | HOLD CAP APP UNTIL L.T. WIND | | $38 | HOLD CAP APP UNTIL L.T. WI | | $38 |
| 696 | REINVEST CAP APP. YR 1 | | $314 | REINVEST CAP APP. YR 1 | | $314 |
| 697 | CURR. MO. | | 0.6% | CURR. MO. | | 0.6% |
| 698 | SELL AT L.T. TAXABLE GAIN | | $2,094 | SELL AT L.T. TAXABLE GAIN | | $2,094 |
| 699 | TAXABLE REINVEST GAINS | | $0 | TAXABLE REINVEST GAINS | | $0 |
| 700 | | | | | | |
| 701 | | | | | | |

FIG. 4B

| | AK | AL | AM | AN | AO |
|---|---|---|---|---|---|
| | | | ·········· DCM ·········· | | |
| 489 | KO | | 3YR | 4YR | 5YR |
| 490 | CURR DCM DTL SYS RECS | | SELL LONG TERM W/ACTIVE REINV. | SELL LONG TERM W/ACTIVE REINV. | SELL LONG TERM W/ACTIVE REINV. |
| 491 | # SHARES    INPUT>>> | 100 | 0.0 | 0.0 | 0.0 |
| 492 | TOTAL COST    >>> | $4,500 | 0.0 | 0.0 | 0.0 |
| 493 | MONTHS UNTIL L.T.  >>> | 1 | 0.0 | 0.0 | 0.0 |
| 494 | MARGINAL RATE   >>> | 39.6% | 0.0 | 0.0 | 0.0 |
| 495 | LONG TERM RATE  >>> | 20.0% | 0.0 | 0.0 | 0.0 |
| 496 | NET SHORT TERM GAINS>> | $0 | | | |
| 497 | NET LONG TERM GAINS >> | $0 | $0 CUR YR TAXES | | |
| 498 | NET 1 CAPITAL GAINS | $0 | | | |
| 499 | OTHER INC. OFFSET AVAIL> | $3,000 | | | |
| 500 | CURR VALUE OF OFFSET | $1,188 | | | |
| 501 | LONG TERM LOSS AVAIL | $0 | | | |
| 502 | ADJUSTED COST | $4,500 | | | |
| 503 | CURRENT STOCK RATE | 39.6% | | | |
| 504 | STRATEGIES | 3YR | 4YR | 5YR | |
| 505 | NEW PURCH AFT TAX VAL | $7,459 | $7,810 | $8,114 | |
| 506 | HOLD X YRS VALUE | $7,048 | $7,399 | $7,703 | |
| 507 | SELL NOW VALUE ACTIVE | $6,552 | $7,037 | $7,880 | |
| 508 | SELL NOW VALUE PASSIVE | $5,864 | $6,054 | $6,848 | |
| 509 | SELL LONG TERM ACTIVE VALUE | $7,467 | $7,998 | $8,433 | |
| 510 | SELL LONG TERM PASSIVE VALUE | $6,685 | $6,895 | $7,266 | |

FIG. 5A

| | | | | |
|---|---|---|---|---|
| 512 | MAX STRATEGY | $7,467 | | $7,998 | | $8,433 |
| 513 | TAX LOSS HARVEST CALCULATIONS | | | | | |
| 514 | ADJUSTED COST/SHARE | $45.00 | EFFECTIVE RATE | | | 20.0% |
| 515 | CURR MKT VAL | $6,556 | | 50% | | 100% |
| 516 | SIMPLE RETURN | 45.7% | TURNOVER | | | 50% |
| 517 | CURRENT AFT TAX VALUE | $5,742 | LONG TERM AFTER TAX VAL | | | $6,175 |
| 518 | PROFIT PER SHARE | $20.56 | | | | |
| 519 | TAX LOSS HARVESTING PRIORTIZATION SCHEDULE | | | | | |
| 520 | GAIN/LOSS MATCHING | 1. ST/ST | | 4. LT/ST NET | | |
| 521 | ST & NET ST LOSSES AVAIL | $0 | | $0 | | |
| 522 | TOTAL STOCK PROFIT | $2,056 | | $0 | | |
| 523 | HARVESTABLE SHARES | 0.0 | | 0.0 | | |
| 524 | S.T. GAINS REMAINING | $0 | | $0 | | |
| 525 | L.T. GAINS REMAINING | $0 | | $0 | | |
| 526 | NET 2 CAPITAL GAINS | $0 | | $0 | | |
| 527 | TOT CURR YR ASSOC TAXES | $0 | | $0 | | |
| 528 | GAIN/LOSS MATCHING | 2. ST/LT | | 3. LT/LT | | |
| 529 | NET LT & LT LOSSES AVAIL | $0 | | $0 | | |
| 530 | TOT REMAINING STK PROFIT | $2,056 | | $0 | | |
| 531 | HARVESTABLE SHARES | 0.0 | | 0.0 | | |
| 532 | S.T. GAINS REMAINING | $0 | | $0 | | |
| 533 | L.T. GAINS REMAINING | $0 | | $0 | | |
| 534 | NET 2 CAPITAL GAINS | $0 | | $0 | | |
| 535 | TOT CURR YR ASSOC TAXES | $0 | | $0 | | |
| 536 | | | | | | |
| 537 | ORIGINAL COST PER SHARE | $45.00 | | | | |
| 538 | COST BASIS ADJUSTMENT | $-0 | | | | |

FIG. 5B

| | AK | AL | AP | AQ | AR |
|---|---|---|---|---|---|
| | | | ********** CUST ********** | | |
| 489 | | | | | |
| 490 | KO | | | | |
| 491 | CURR DCM DTL SYS RECS | | 0 | SELL LONG TERM W/ACTIVE REINV. | SELL LONG TERM W/ACTIVE REINV. |
| 492 | # SHARES    INPUT>>> | 100 | 100 | 0.0 | 0.0 |
| 493 | TOTAL COST      >>> | $4,500 | $4,500 | 0.0 | 0.0 |
| 494 | MONTHS UNTIL L.T.  >>> | 1 | 1 | 0.0 | 0.0 |
| 495 | MARGINAL RATE   >>> | 39.6% | 39.6% | 0.0 | 0.0 |
| 496 | LONG TERM RATE  >>> | 20.0% | 20.0% | 0.0 | 0.0 |
| 497 | NET SHORT TERM GAINS>> | $0 | $0 | | |
| 498 | NET LONG TERM GAINS >> | $0 | $0 | $0 | CUR YR TAXES |
| 499 | NET 1 CAPITAL GAINS | $0 | $0 | | |
| 500 | OTHER INC. OFFSET AVAIL> | $3,000 | $3,000 | | |
| 501 | CURR VALUE OF OFFSET | $1,188 | $1,188 | | |
| 502 | LONG TERM LOSS AVAIL | $0 | $0 | | |
| 503 | ADJUSTED COST | $4,500 | $4,500 | | |
| 504 | CURRENT STOCK RATE | 39.6% | 39.6% | | |
| 505 | STRATEGIES | 3YR | 3YR | 4YR | 5YR |
| 506 | NEW PURCH AFT TAX VAL | $7,459 | $7,459 | $7,810 | $8,114 |
| 507 | HOLD X YRS VALUE | $7,048 | $7,048 | $7,399 | $7,703 |
| 508 | SELL NOW VALUE ACTIVE | $6,552 | $6,552 | $7,037 | $7,880 |
| 509 | SELL NOW VALUE PASSIVE | $5,864 | $5,864 | $6,054 | $6,848 |
| 510 | SELL LONG TERM ACTIVE VALUE | $7,467 | $7,467 | $7,998 | $8,433 |
| 511 | SELL LONG TERM PASSIVE VALUE | $6,685 | $6,685 | $6,895 | $7,266 |
| 512 | MAX STRATEGY | $7,467 | $7,467 | $7,998 | $8,433 |

FIG. 5C

| | | | | | |
|---|---|---|---|---|---|
| 513 | TAX LOSS HARVEST CALCULATIONS | | | | |
| 514 | ADJUSTED COST/SHARE | | $45.00 | EFFECTIVE RATE | 20.0% |
| 515 | CURR MKT VAL | | $6,556 | | 100% |
| 516 | SIMPLE RETURN | | 45.7% | TURNOVER | 50% |
| 517 | CURRENT AFT TAX VALUE | | $5,742 | LONG TERM AFTER TAX VAL | $6,175 |
| 518 | PROFIT PER SHARE | | $20.56 | | |
| 519 | TAX LOSS HARVESTING PRIORTIZATION SCHEDULE | | | | |
| 520 | GAIN/LOSS MATCHING | 1. ST/ST | 1. ST/ST | 4. LT/ST NET | |
| 521 | ST & NET ST LOSSES AVAIL | $0 | $0 | | $0 |
| 522 | TOTAL STOCK PROFIT | $2,056 | $2,056 | | |
| 523 | HARVESTABLE SHARES | 0.0 | 0.0 | | 0.0 |
| 524 | S.T. GAINS REMAINING | $0 | $0 | | $0 |
| 525 | L.T. GAINS REMAINING | $0 | $0 | | $0 |
| 526 | NET 2 CAPITAL GAINS | $0 | $0 | | $0 |
| 527 | TOT CURR YR ASSOC TAXES | | | | |
| 528 | GAIN/LOSS MATCHING | 2. ST/LT | 2. ST/LT | 3. LT/LT | |
| 529 | NET LT & LT LOSSES AVAIL | $0 | $0 | | $0 |
| 530 | TOT REMAINING STK PROFIT | $2,056 | $2,056 | | |
| 531 | HARVESTABLE SHARES | 0.0 | 0.0 | | 0.0 |
| 532 | S.T. GAINS REMAINING | $0 | $0 | | $0 |
| 533 | L.T. GAINS REMAINING | $0 | $0 | | $0 |
| 534 | NET 2 CAPITAL GAINS | $0 | $0 | | $0 |
| 535 | TOT CURR YR ASSOC TAXES | | | | |
| 536 | | | | | |
| 537 | ORIGINAL COST PER SHARE | | $45.00 | $45.00 | |
| 538 | COST BASIS ADJUSTMENT | | $-0 | $-0 | |

| | AK | AL | AM | AN | AO | AP | AQ |
|---|---|---|---|---|---|---|---|
| 606 | DCM EXPECTATION OPTIMIZATIONS STRATEGIES | | | | | BOTH RESULTS ARE EQUAL | |
| 607 | | | | | | | |
| 608 | THREE YEAR HORIZON OPTIMIZING RECOMMENDATION: | | | | | SELL LONG TERM W/ACTIVE REINV. | |
| 609 | | | | | | | |
| 610 | FOUR YEAR HORIZON OPTIMIZING RECOMMENDATION: | | | | | SELL LONG TERM W/ACTIVE REINV. | |
| 611 | | | | | | | |
| 612 | FIVE YEAR HORIZON OPTIMIZING RECOMMENDATION: | | | | | SELL LONG TERM W/ACTIVE REINV. | |
| 613 | | | | | | | |
| 614 | | | | | 3YR | 4YR | 5YR |
| 615 | | | | | | | |
| 616 | NEW PURCH 5TH YR AFT TAX VALUE | | | | $7,459 | | $7,810 $8,114 |
| 617 | HOLD POSITION FOR HORIZON | | | | $7,048 | | $7,399 $7,703 |
| 618 | SELL NOW W/ACTIVE REINVESTMENT | | | | $6,552 | | $7,037 $7,880 |
| 619 | SELL NOW W/PASSIVE REINVESTMENT | | | | $5,864 | | $6,054 $6,848 |
| 620 | SELL LONG TERM W/ACTIVE REINV. | | | | $7,467 | | $7,998 $8,433 |
| 621 | SELL LONG TERM W/PASSIVE REINV. | | | | $6,685 | | $6,895 $7,266 |
| 622 | | | | | | | |
| 623 | | | | | | | |
| 624 | | | | | | | |
| 625 | DCM MAXIMUM STRATEGY | | | | $7,467 | | $7,998 $8,433 |
| 626 | | | | | | | |
| 627 | | | | | | | |
| 628 | CUSTOMER EXPECTATIONS OPTIMIZATION STRATEGIES | | | | | BOTH RESULTS ARE EQUAL | |
| 629 | | | | | | | |
| 630 | THREE YEAR HORIZON OPTIMIZING RECOMMENDATION: | | | | | SELL LONG TERM W/ACTIVE REINV. | |
| 631 | | | | | | | |
| 632 | FOUR YEAR HORIZON OPTIMIZING RECOMMENDATION: | | | | | SELL LONG TERM W/ACTIVE REINV. | |
| 633 | | | | | | | |
| 634 | FIVE YEAR HORIZON OPTIMIZING RECOMMENDATION: | | | | | SELL LONG TERM W/ACTIVE REINV. | |
| 635 | | | | | | | |
| 636 | | | | | 3YR | 4YR | 5YR |
| 637 | | | | | | | |
| 638 | NEW PURCH 5TH YR AFT TAX VALUE | | | | $7,459 | | $7,810 $8,114 |
| 639 | HOLD POSITION FOR HORIZON | | | | $7,048 | | $7,399 $7,703 |
| 640 | SELL NOW W/ACTIVE REINVESTMENT | | | | $6,552 | | $7,037 $7,880 |
| 641 | SELL NOW W/PASSIVE REINVESTMENT | | | | $5,864 | | $6,054 $6,848 |
| 642 | SELL LONG TERM W/ACTIVE REINV. | | | | $7,467 | | $7,998 $8,433 |
| 643 | SELL LONG TERM W/PASSIVE REINV. | | | | $6,685 | | $6,895 $7,266 |
| 644 | | | | | | | |
| 645 | | | | | | | |
| 646 | | | | | | | |
| 647 | CUSTOMER MAXIMUM STRATEGY | | | | $7,467 | | $7,998 $8,433 |

| A | AK | AL | AM | AN | AO | AP | AQ | AR |
|---|---|---|---|---|---|---|---|---|
| 671 | DRG STRATEGIES | | | | SELL STOCK NOW | | SELL STOCK LONG T | |
| 672 | | NEW | HOLD POS. | | AND REINVEST | | AND THEN REINVEST | |
| 673 | | PURCHA | FOR FIVE | | DCM | S&P500 | DCM | S&P500 |
| 674 | | $ YR HOL | YEARS | | | | | |
| 675 | | | | | | | | |
| 676 | FIXED FEES | 2.0% | 2.0% | | 2.0% | 2.0% | 2.0% | 2.0% |
| 677 | TOT RET. POT. | 8.0% | 8.0% | | 11.3% | 7.3% | 11.3% | 7.3% |
| 678 | DIVIDEND YLD | 0.9% | 0.9% | | 1.8% | 1.8% | 1.8% | 1.8% |
| 679 | APPREC. RATE | 7.1% | 7.1% | | 9.5% | 5.5% | 9.5% | 5.5% |
| 680 | COST | $6,556 | $4,500 | | $4,500 | $4,500 | $4,500 | $4,500 |
| 681 | | | | | | | | |
| 682 | CURRENT | | | | | | | |
| 683 | MARKET VALUE | $6,556 | $6,556 | | $6,556 | $6,556 | $6,556 | $6,556 |
| 684 | AFT TAX VAL | $6,556 | $5,742 | | $5,742 | $5,742 | $5,742 | $5,742 |
| 685 | | | | | | | | |
| 686 | YR 1 CAP APP | $466 | $466 | | $543 | $318 | $573 | $351 |
| 687 | TAXABLE GAIN | $0 | $0 | | $272 | $0 | $2,362 | $2,094 |
| 688 | YR 1 DIV. INC | $60 | $60 | | $103 | $103 | $106 | $106 |
| 689 | YR 1 C.G. TAX | $0 | $0 | | $108 | $0 | $472 | $419 |
| 690 | YR 1 ORD. TAX | $24 | $24 | | $41 | $41 | $42 | $42 |
| 691 | YR 1 FIXED | $131 | $131 | | $115 | $115 | $131 | $131 |
| 692 | YR 1 COMM EXP | $0 | $0 | | $0 | $0 | $0 | $0 |
| 693 | VAL END YR 1 | $6,927 | $6,927 | | $6,125 | $6,007 | $6,590 | $6,422 |
| 694 | YR 2 CAP APP | $492 | $492 | | $580 | $333 | $624 | $356 |
| 695 | TAXABLE GAIN | $0 | $0 | | $426 | $0 | $446 | $0 |
| 696 | YR 2 DIV. INC | $66 | $66 | | $109 | $107 | $118 | $115 |
| 697 | YR 2 C.G. TAX | $0 | $0 | | $85 | $0 | $89 | $0 |
| 698 | YR 2 ORD. TAX | $26 | $26 | | $43 | $42 | $47 | $45 |
| 699 | YR 2 FIXED | $139 | $139 | | $122 | $120 | $132 | $128 |
| 700 | YR 2 COMM EXP | $0 | $0 | | $0 | $0 | $0 | $0 |
| 701 | VAL END YR 2 | $7,320 | $7,320 | | $6,563 | $6,285 | $7,064 | $6,718 |
| 702 | YR 3 CAP APP | $520 | $520 | | $621 | $348 | $669 | $372 |
| 703 | TAXABLE GAIN | $0 | $0 | | $523 | $0 | $557 | $0 |
| 704 | YR 3 DIV. INC | $73 | $73 | | $117 | $112 | $126 | $120 |
| 705 | YR 3 C.G. TAX | $0 | $0 | | $105 | $0 | $111 | $0 |
| 706 | YR 3 ORD. TAX | $29 | $29 | | $46 | $44 | $50 | $47 |
| 707 | YR 3 FIXED | $146 | $146 | | $131 | $126 | $141 | $134 |
| 708 | YR 3 COMM EXP | $0 | $0 | | $0 | $0 | $0 | $0 |
| 709 | VAL END YR 3 | $7,738 | $7,738 | | $7,019 | $6,575 | $7,556 | $7,029 |
| 710 | YR 4 CAP APP | $549 | $549 | | $664 | $364 | $715 | $390 |
| 711 | TAXABLE GAIN | $0 | $0 | | $594 | $0 | $636 | $0 |

FIG. 7A

| # | | | | | | | |
|---|---|---|---|---|---|---|---|
| 712 | YR 4 DIV. INC | $80 | $80 | | $125 | $117 | $135 | $125 |
| 713 | YR 4 C.G. TAX | $0 | $0 | | $119 | $0 | $127 | $0 |
| 714 | YR 4 ORD. TAX | $32 | $32 | | $50 | $46 | $53 | $50 |
| 715 | YR 4 FIXED | $155 | $155 | | $140 | $132 | $151 | $141 |
| 716 | YR 4 COMM EXP | $0 | $0 | | $0 | $0 | $0 | $0 |
| 717 | VAL END YR 4 | $8,181 | $8,181 | | $7,500 | $6,879 | $8,074 | $7,354 |
| 718 | YR 5 CAP APP | $581 | $581 | | $710 | $381 | $764 | $408 |
| 719 | TAXABLE GAIN | $2,683 | $4,739 | | $1,304 | $1,745 | $1,400 | $1,877 |
| 720 | YR 5 DIV. INC | $88 | $88 | | $134 | $123 | $144 | $131 |
| 721 | YR 5 C.G. TAX | $537 | $948 | | $261 | $349 | $280 | $375 |
| 722 | YR 5 ORD. TAX | $35 | $35 | | $53 | $49 | $57 | $52 |
| 723 | YR 5 FIXED | $164 | $164 | | $150 | $138 | $161 | $147 |
| 724 | YR 5 COMM EXP | $0 | $0 | | $0 | $0 | $0 | $0 |
| 725 | VAL END YR 5 | $8,114 | $7,703 | | $7,880 | $6,848 | $8,484 | $7,318 |
| 726 | | | | | | | | |
| 727 | FIVE YEAR TOTALS | | | | | | | |
| 728 | TARGET PRICE | $92.39 | $92.39 | | | | | |
| 729 | TARGET SELL | $9,239 | $9,239 | | | | | |
| 730 | COST BASIS | $6,556 | $4,500 | | | | | |
| 731 | DIV INCOME | $366 | $366 | | $588 | $562 | | |
| 732 | GROSS PROFIT | $3,049 | $5,106 | | | | | |
| 733 | C.G. TAXES | $537 | $948 | | $677 | $349 | | |
| 734 | ORD TAX | $145 | $145 | | $233 | $223 | | |
| 735 | FIXED FEES | $734 | $734 | | $659 | $630 | | |
| 736 | COMM. EXP | $0 | $0 | | $0 | $0 | | |
| 737 | NET VALUE | $8,189 | $7,778 | | | | | |
| 738 | NET PROFIT | $1,633 | $3,278 | | | | | |
| 739 | | | | | | | | |
| 740 | AFTER TAX IRR | 4.36% | 6.26% | | 6.53% | 3.59% | | |
| 741 | CURR AFT TAX VAL | ($6,556) | ($5,742) | | ($5,742) | ($5,742) | | |
| 742 | | $0 | $0 | | $0 | $0 | | |
| 743 | | $0 | $0 | | $0 | $0 | | |
| 744 | | $0 | $0 | | $0 | $0 | | |
| 745 | | $0 | $0 | | $0 | $0 | | |
| 746 | | $8,114 | $7,778 | | $7,880 | $6,848 | | |
| 747 | APPREC. RATE | 7.10% | 7.10% | | | | | |
| 748 | | ($66) | ($66) | | | | | |
| 749 | | $0 | $0 | | | | | |
| 750 | | $0 | $0 | | | | | |
| 751 | | $0 | $0 | | | | | |
| 752 | | $0 | $0 | | | | | |
| 753 | | $92 | $92 | | | | | |
| 754 | | | | | | | | |
| 755 | 3YRDRG STRAT C.G. | $1,498 | $3,555 | UNREALI | $2,334 | $3,555 | $190 | $1,461 |
| 756 | 3YRDRG AFTTAX VAL | $7,459 | $7,048 | | $6,552 | $5,864 | $7,518 | $6,737 |
| 757 | 4YRDRG STRAT C.G. | $2,070 | $4,127 | UNREALI | $2,312 | $4,127 | $126 | $2,033 |
| 758 | 4YRDRG AFTTAX VAL | $7,810 | $7,399 | | $7,037 | $6,054 | $8,049 | $6,947 |
| 759 | 3YRCUST STRAT C.G. | $1,498 | $3,555 | UNREALI | $2,334 | $3,555 | $190 | $1,461 |
| 760 | 3YRCUST AFTTAX VAL | $7,459 | $7,048 | | $6,552 | $5,864 | $7,518 | $6,737 |
| 761 | 4YRCUST STRAT C.G. | $2,070 | $4,127 | UNREALI | $2,312 | $4,127 | $126 | $2,033 |
| 762 | 4YRCUST AFTTAX VAL | $7,810 | $7,399 | | $7,037 | $6,054 | $8,049 | $6,947 |

FIG. 7B

COMPUTERIZED SYSTEM AND METHOD FOR OPTIMIZING AFTER-TAX PROCEEDS

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

This invention concerns a computer method and system for processing financial securities and instruments. More particularly, this invention accurately determines the after-tax proceeds an investor could expect to have at the end of a holding period for each of a set of investment strategies and determines an optimal strategy for maximizing such after-tax proceeds.

Taxation is a significant concern to investors and others who are evaluating capital investment transactions such as buying or selling a stock. A transaction that appears to yield a certain before-tax profit may prove less profitable than anticipated after taxes are assessed. Similarly, a transaction that appears to produce a financial loss may actually prove to be less of a loss when tax-losses are offset against capital gains and the liquidated capital is re-invested.

Frequently an investment is sold to re-invest the proceeds in another potentially more profitable capital investment vehicle, and so not merely to liquidate profits. However, the consequences of selling a currently held investment instrument to buy an alternate instrument can only be accurately evaluated by knowing the tax consequences of the transaction in advance. This is particularly true under most capital gain taxation regimes because different, usually lower, tax rates are applied when the investment is held for longer periods. Under some capital gains tax laws the tax rate may be reduced after a specified holding period, such as 1 year.

Investors and others who manage financial transactions need to be able to assess the after-tax consequences of potential transactions. More importantly, they need to be aware, a priori, of the after-tax consequences of a potential transaction in order to make informed investment decisions that optimize after-tax profits. In order to produce optimal after-tax results, the consequences of each transaction must be made in light of an investor's past and current transactions, the available investment alternatives, their tax bracket, and other factors.

A need exists for a system or method which finds optimal solutions to after-tax investment yields. Previous investment analysis mechanisms have not adequately taken into account the taxation profile and investment expectations of each individual investor, nor do they operate over an entire portfolio. In addition there is a need for a system or method which allows users to make a priori and "what if" calculations to guide their investment decisions.

One known method that attempts to solve the capital gains tax problem is called tax efficiency. Tax efficiency strategies approach the capital gains taxation problem by adopting a low turn-over strategy, where investments are held for periods that are at least long enough to lower the capital gains tax rates. Typically, under the tax efficiency investment discipline, an investor selects low dividend instruments and holds these instruments long enough to avoid higher capital gains rates. This approach, as titled, may be efficient in that it attempts to reduce the tax consequences of investing. However, in doing so, it eliminates the potential of achieving the highest level of after-tax proceeds, by not assessing if and when a stock which should be sold prior to the long-term window, in order to optimize the highest returns by calculating the economic break-even point of advantage. Accordingly, a need exists for a system or method which takes such re-investment considerations into account.

SUMMARY OF THE INVENTION

A computerized system and method optimizes after-tax proceeds using an after-tax calculation engine employing "DYNAMIC TAX LOGIC" commercially available from Dynamic Capital Management, The computerized system and method accurately determines the after-tax amount of money an individual could expect to have at the end of a holding period for each of a set of investment strategies associated with a particular lot of stock held.

The disclosed computerized system provides several key advantages for investors and others who are interested in optimizing after-tax return on capital investments. These include:

(1) A priori knowledge to provide the ability for investors to see the tax consequences of their investment decisions in advance;

(2) "What if" calculations allowing investors to immediately see the projected results of their transaction decisions without actually executing the trades or doing their tax returns; and (3) Self-managed expectations in which evaluation of the expected return of an investment, either one that is currently held or an alternate that is being considered, is a subjective process that involves some risk. Therefore, it is important for users to evaluate different investment strategies under different sets of performance expectations. In the disclosed computerized system, expectations (such as, for example, price targets) are specified by the user. Users can either use expectations supplied by a fund manager or use expectations which they have determined themselves.

The computerized system and method helps to produce optimal investment strategies that not only maximize after-tax profits for the individual investor but which also serve the socially useful purpose of increasing capital mobility and allocating investment capital in those areas where it is most productive, for example, where it generates the most wealth. Thus, the computerized system and method mitigates real and perceived inhibitions on capital mobility that result from the perception of economic distortions that may be caused by the lack of understanding, a priori, of the effects on wealth generation by our tax laws.

The computerized system and method allows users to answer the following multi-part investment question before committing to a transaction:

At what price does it make sense to:

(1) sell an investment instrument;

(2) pay the associated capital gains tax and other fees; and (3) re-invest in another, potentially better, investment instrument?

A key variable to be determined is the holding period or investment horizon, which is arbitrarily determined by the investor. In an illustrative embodiment this period may be specified to be a 36 month, a 48 month or a 60 month extended holding period, but any arbitrary period length may be programmed and used.

The application of the computerized system and method involves, for example, building the following set of unique assumptions, a specific fact set, and a set of expectations that are applicable to each subject lot. The fact set may include:

(1) the current market price that the subject lot could be currently sold for;

(2) the lot owner's long-term and short-term marginal rates that would be applicable to the subject lot;

(3) the number of shares included in the lot;

(4) the total cost of the lot;

(5) the number of months remaining until a held position would enter the long-term tax window, when rounded up to the longest month;

(6) an annual percentage advisor fee, if applicable, and/or an annual brokerage wrap fee, if applicable; and (7) a cents per share brokerage expense, if applicable.

The following expectation set may be used, and include:

(1) an assumption about the subject stock price at the beginning of the long-term window, and at the termination of an existing 36, 48, or 60 month investment horizon, arrived at by either assuming an earnings base, a five year earnings growth rate and price earnings (PE) assumption for the subject stock or a static target price for the subject stock for the termination of either a 36, 48, or 60 month investment horizon;

(2) the dividend rate of the subject stock;

(3) the dividend growth rate of the held stock;

(4) the total before-tax-return potential from either a specific stock or an otherwise active re-investment discipline option, assuming the various alternate re-investment options all calculate dividend rates equal to a current rate of the S&P500;

(5) the turnover assumption anticipated with any re-investment strategy;

(6) a five-year growth rate assumption for the Standard & Poor's 500 (S&P500), where a passive strategy comparison is desired;

(7) a five-year price-earnings forecast for the S&P500; and (8) an assumption as to how vulnerable to an immediate loss a specific lot might be subject to.

The computerized system and method then compares the after-tax proceeds of several investment strategies to identify which is optimal from an after-tax perspective. The computerized system and method may evaluate the following example strategies:

(1) purchasing a lot of a security at the currently inputted price and holding for the selected holding period;

(2) holding an existing lot position until the termination of an investment horizon;

(3) selling the lot at currently inputted prices and re-investing in another lot or otherwise in an active investment discipline for a specified investment horizon;

(4) selling the lot at currently inputted prices and re-investing in a secondary or S&P500-based passive discipline for a specified investment horizon;

(5) selling the lot at the beginning of the long-term window and re-investing in a primary or active investment discipline, for the number of months remaining after an anticipated sell, for a specified investment horizon; or (6) selling the lot at the beginning of the long-term window and re-investing in an S&P500-based passive discipline for the number of months remaining after an anticipated sell, for a specified investment horizon.

BRIEF DESCRIPTION OF THE DRAWINGS

FIGS. 3A–3G show spreadsheet embodiments of client input customization windows where users or others can enter facts about the investment lot that is being evaluated.

FIGS. 4A–4B show a spreadsheet embodiment of the price targeting module which computes target prices and sales and taxable gains for lot re-investment.

FIGS. 5A–5D show a spreadsheet embodiment of the tax loss harvest analyzer which offsets tax credits from investments that were sold at a loss against other capital gains in an optimizing strategy. A loss is harvested when raising the cost-basis of a gain by the amount of a loss which reduces the taxes enough to generate higher after-tax proceeds re-invested for higher returns.

FIG. 6 shows a spreadsheet embodiment of the comparative pro-forma sensitivity analyzer in which cell formulas for the spreadsheet embodiment of the pro-forma sensitivity analyzer are presented in Appendix A.

FIGS. 7A and 7D show a spreadsheet embodiment of the optimal strategy window which displays results of the pro-forma processing, such as the optimal strategies for producing after-tax proceeds.

DETAILED DESCRIPTION OF THE PREFERRED EMBODIMENT

Figure 1:
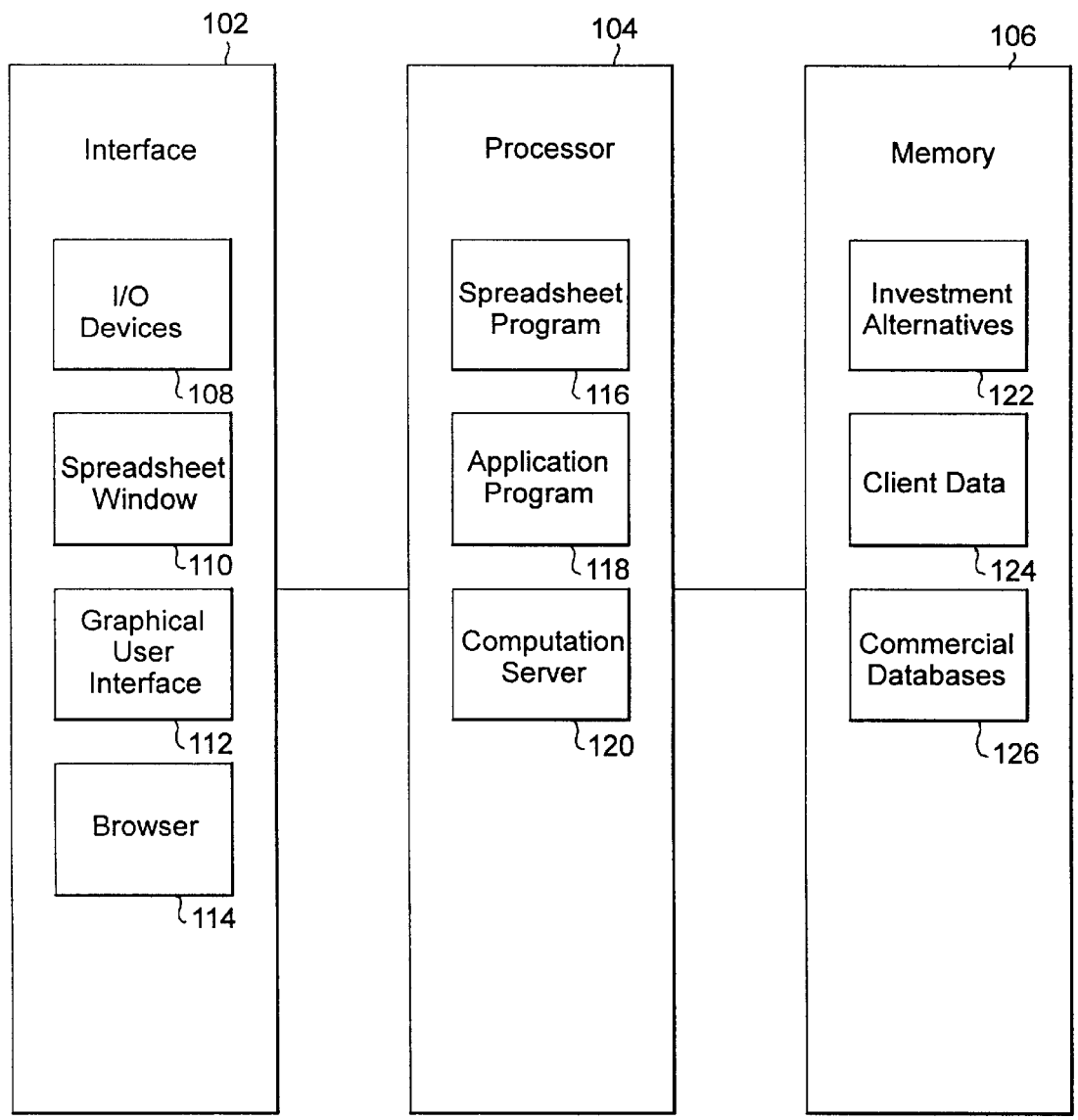
FIG. 1 shows the disclosed computerized system for optimizing after-tax proceeds.

The computerized system 100 and method for implementing the invention includes a user interface 102 indicated in FIG. 1, a processor 104, and memory 106. The user interface 102 is used for entering the financial data to be processed, for displaying results of the processing, and for other purposes. As shown in FIG. 1, the user interface 102 may include input/output (I/O) devices 108, a spreadsheet window 110, a graphic user interface (GUI) 112, and/or a browser 114. The processor 104 includes hardware and/or software for performing the analysis, in which the processor 104 may include one or more computers. For example, a processor 104 may include a "PENTIUM" available from "INTEL", connected to a personal computer and/or a server over an intranet and/or the Internet. The memory 106 includes a variety of information about investment alternatives, performance expectations for these investment alternatives, client data, and other information.

The computerized system 100 and method may be embodied as a standalone program such as a spreadsheet 116 or dedicated application 118. Examples of spreadsheets include commercially available programs such as "LOTUS 123", "EXCEL" or others. A dedicated application program 118 may be implemented in a number of computer programming languages such as "JAVA", C, C++, APL, COBOL, BASIC or others. Such a dedicated application 118 might be implemented on various computing platforms and operating systems, including "MICROSOFT WINDOWS", the "APPLE MACINTOSH" or other systems. The spreadsheet 116 and/or the dedicated application 118 may also be used with computer-readable medium, such as a diskette, a portable hard drive, a magnetic tape or disk, a CD-ROM, and the like for use in a computer to optimize after-tax proceeds, with the computer read-able medium storing spreadsheet 116 and/or the dedicated application 118 as a predetermined software program implementing a method comprising, for example, the steps of: receiving tax and investment data, user-customized investment expectations, and financial adviser-based investment expectations; performing tax loss harvesting analysis on the user-customized investment expectations and the financial adviser-based investment expectations over a dynamic taxation time range using a predetermined software program; performing comparative pro-forma tax sensitivity analysis of the tax and investment data and the analyzed investment expectations using the predetermined software program; and determining and outputting an optimal after-tax investment strategy path from a plurality of investment strategy paths over the dynamic taxation time range using the predetermined software program to optimize the after-tax proceeds from the plurality of investment strategies.

The invention may also be embodied as a networked or distributed system such as an Internet-based application and/or a World Wide Web (WWW)-based application on the Internet and connected components. Other embodiments are also possible such as intranet and extranet applications accessible by the browser 114. The spreadsheet and World Wide Web embodiments are described in more detail below.

In the spreadsheet embodiment, a spreadsheet includes a set of input and output windows, stored data cells, and formula cells. The spreadsheet applies the computerized system 100 and method for optimizing after-tax proceeds by applying the formula cells to the user inputs and stored data cells to produce a set of cells including projected results of the strategies that optimize after-tax proceeds.

Figure 2:
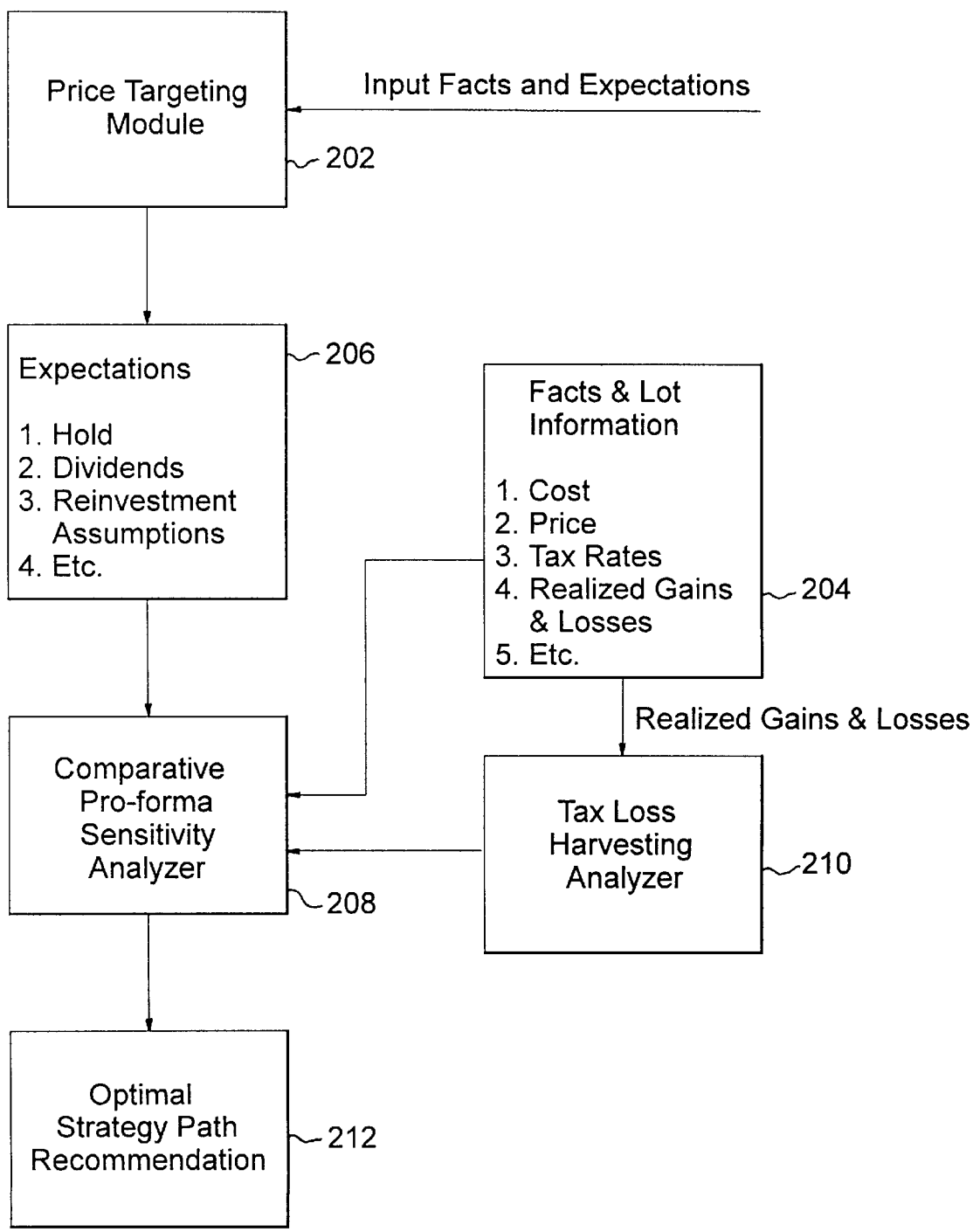
FIG. 2 shows a flow chart of the operation of the computerized method and system.

The spreadsheet embodiment includes six primary modules which are shown in FIG. 2. Investors or other users may operate the program through a set of input windows that correspond to system modules 204, 206 shown in FIG. 2. Facts about the user's investment situation and information about the lot of investment instruments that the user is analyzing are input in block 204. Expectations that the user has or specifies are input in block 206, which may include but are not limited to holds, dividends, re-investment assumptions, etc. for processing by the tax loss harvesting analyzer 210. Note that it is possible for the user to enter their own expectations or to use a set of expectations provided by others, such as a financial investment advisor. The computerized method and system 100 computes optimal after-tax proceeds using formulas in cells forming the modules shown in blocks 202, 208, and 210. The price targeting module 202 determines reasonable target prices over various time horizons.

The tax loss harvesting analyzer 210 applies tax credits that have accrued from transactions which produced a loss and applies these credits to offset potential capital gains from existing or future transactions which are profitable. The pro-forma sensitivity analyzer 208 assesses alternative investment strategies in light of information provided by the modules described above, and other financial analysis modules. The results of the analysis are presented and/or output to the user in the optimal strategy path window 212. Thus the user may make iterative adjustments in the user input window and observe results of the changes in the optimal strategy path recommendation window.

The user input window 204 and shown in more detail in FIGS. 3A–3G includes variables that the user may adjust.

FIG. 3A includes cells AK549-AP584 for inputting subjective assumptions of a financial adviser as SYSTEM DEFAULTS, and of a client/customer as CUSTOM ASSUMPTIONS. FIGS. 3B–3G include cells CM1-CR161 for inputting client/customer data such as short-term and long-term tax rates, as well as for inputting data from a financial advisor, in this case "DYNAMIC CAPITAL MANAGEMENT" (DCM), to store such tax rates and/or data. Such input data may be used by other portions of the spreadsheet, such as the cells shown in Appendix A, as well as by other alternative embodiments such as a website implementing the disclosed computerized system 100 and method.

For example, referring to FIG. 3A, on row 561 the user may specify a five year target price for the value of the financial instrument which is being analyzed, for example in this case a stock. The fact sets and set of expectations may be entered either by a financial advisor or by the user. In the example shown in FIG. 3A, the financial advisor may input his/her default values in column AN, while the customized assumptions of a client, which may be different from such values of the financial advisor, may be input in column AP. These variables input in columns AN and AP and specified in rows 556–584 in FIG. 3A include the short-term and long-term tax rates and other related parameters. For example, in cells AN561 and AP561, the five year target price specified by both the financial adviser and the client is set to 16.0%. In this manner, the financial advisor working with the client or working individually can performed different permutations of investment assumptions to implement conservative or aggressive investment strategies to optimize the after-tax proceeds.

FIGS. 4A–4B depict the capital gains determined using sale prices resulting from the price targeting module 202, with such capital gains realized based on the assumptions of both financial advisor, such as DCM, and the customer, and with such capital gains realized for both the short-term and long-term windows over the succeeding 12 month period. For example, based on the input data, the price targeting module 202 may indicate that the long-term window market value is $6,594 for active long-term re-investment, based on both the assumptions of the financial advisor (DCM), as specified in cell C694, and the customized assumptions of the client, as specified in cell F694.

The tax loss harvester 210, shown in more detail in FIGS. 5A–5D, applies tax credits that have accrued from transactions which produced a loss and applies these credits to offset potential capital gains from existing or future transactions which are profitable. Referring to cells AK490-AO538 in FIGS. 5A–5D and the corresponding cells with associated formulae in Appendix A, the tax loss harvester 210 calculates tax effects for windows such as 36 months, 48 months, and 60 months. For example, the net long term gains based on the input data are specified in cell AM498, which is determined using a conditional expression IF(AL508=AL512,$AM523,0). Upon determining that the equality condition exists, the value of cell AM498 is determined to be the value of cell AM523. Otherwise, upon inequality, the value of cell AM498 is set to 0. In the present example, inequality exists, so the net long term gains are determined to be 0. Similarly, using the formulae in Appendix A, the tax loss harvester 210 with the associated spreadsheet window and parameters determines the various cells shown in FIGS. 5A–5D.

Using the tax loss harvester 210, optimization is further enhanced by utilizing losses against gains on stocks with the least return potential, by raising the cost basis of the gain in a dollar amount not exceeding a respective loss. Such raising of the cost basis thereby reduces the profits, and yields enough higher after-tax proceeds of a sale option, that of exceeding a hold or a wait until the long-term window emerges, if applicable, and thereby achieves optimum after-tax dollars through more aggressive re-investment.

Results may be viewed in the output window, or optimal strategy path module 212 and shown in detail in FIG. 6, including cells AK606-AQ647, with associated formulae shown in Appendix A. This window presents different investment strategies such as holding the investment, selling the investment immediately with either active or passive re-investment, or selling the investment long-term, again with active or passive re-investment. By presenting such investment information in column form, the system 100 and method permit a user to compare and choose the optimal results of several investment options.

For the optimal strategy path module 212, many of the values in the cells AK606-AQ647 are obtained from the cells CP60–CP146 shown, for example, in FIGS. 3B–3D, which are in turn determined by the comparative pro-forma sensitivity analyzer module 208 using predetermined formulae in the cells AL676-AR725 in Appendix A associated with the comparative pro-forma sensitivity analyzer module 208. For example, the five year value for a sell-now with passive re-investment strategy, indicated in cell AQ619 in FIG. 6, has the value of cell CP71, specified in Appendix A, which in turn has the value of cell AP725 shown in Appendix A, involving calculations of the comparative pro-forma sensitivity analyzer module 208 shown in FIG. 7. Accordingly, cell AP725 determines the value of:

AP717+AP718+AP720−AP721−AP722−AP723−AP724 as shown in the formula in cell AP725 in Appendix A, which reflects the addition of the after-tax values of a lot after year four with the year five capital appreciation and the year five dividend income, less the year five capital gains tax and the ordinary tax, any year five fixed fee, and year five commission expenses. With such calculations performed by the predetermined formulae in cells AL676-AR725, the optimal strategy path module 212 determines and displays the various recommendations based on the calculations of the comparative pro-forma sensitivity analyzer module 208.

The comparative pro-forma sensitivity analyzer module 208 in FIG. 7 compares different investment strategies based on the results from other modules of the computerized system. Formulas in the spreadsheet cells, such as the cells AK671-AR762 shown in Appendix A, apply the Dynamic Tax Logic (DTL) process implemented in FIGS. 3A–7 to various sets of investment alternatives to find strategies that produce optimal after-tax proceeds. For example, in Appendix A, the cell formula at AL683 computes the value of the investment lot held for five years by multiplying the number of shares specified in predetermined locations in memory, such as in cells which receive such data from a user or a database. For example, in one embodiment, the value in cell AL683 is determined by multiplying the values in cell AN573 corresponding to the number of shares by the last or current stock price specified in B2.

Additional cells throughout the spreadsheet may store additional data and formula for use by the modules 202–212, and have either input data or predetermined formulae. For example, cell F18 may include a dividend growth rate for use in determining year two dividend income for new purchase and for held positions in cells AL696 and AM696, respectively, as per Appendix A. Similarly, CP55 stores a stock supportable dividend yield for use by the formulae in cells AL678-AM678 and the corresponding values specified in FIG. 7.

In addition to the modules described above, other cells in the spreadsheet contain further information on the universe of investment alternatives currently tracked in the spreadsheet. This includes current and historical information on the universe of investment alternatives, information on past market performance, and other information. It is understood that the spreadsheet and/or memory locations may store and access information and data for processing by the modules 202–212, including text, data, and formulae which are known in the art for implementing the disclosed invention. A variety of analytic measures that further describe the actual past performance and expected future performance of these investment instruments are computed by a predetermined set of formulas in cells and stored for use by other modules in the spreadsheet.

Figure 8:
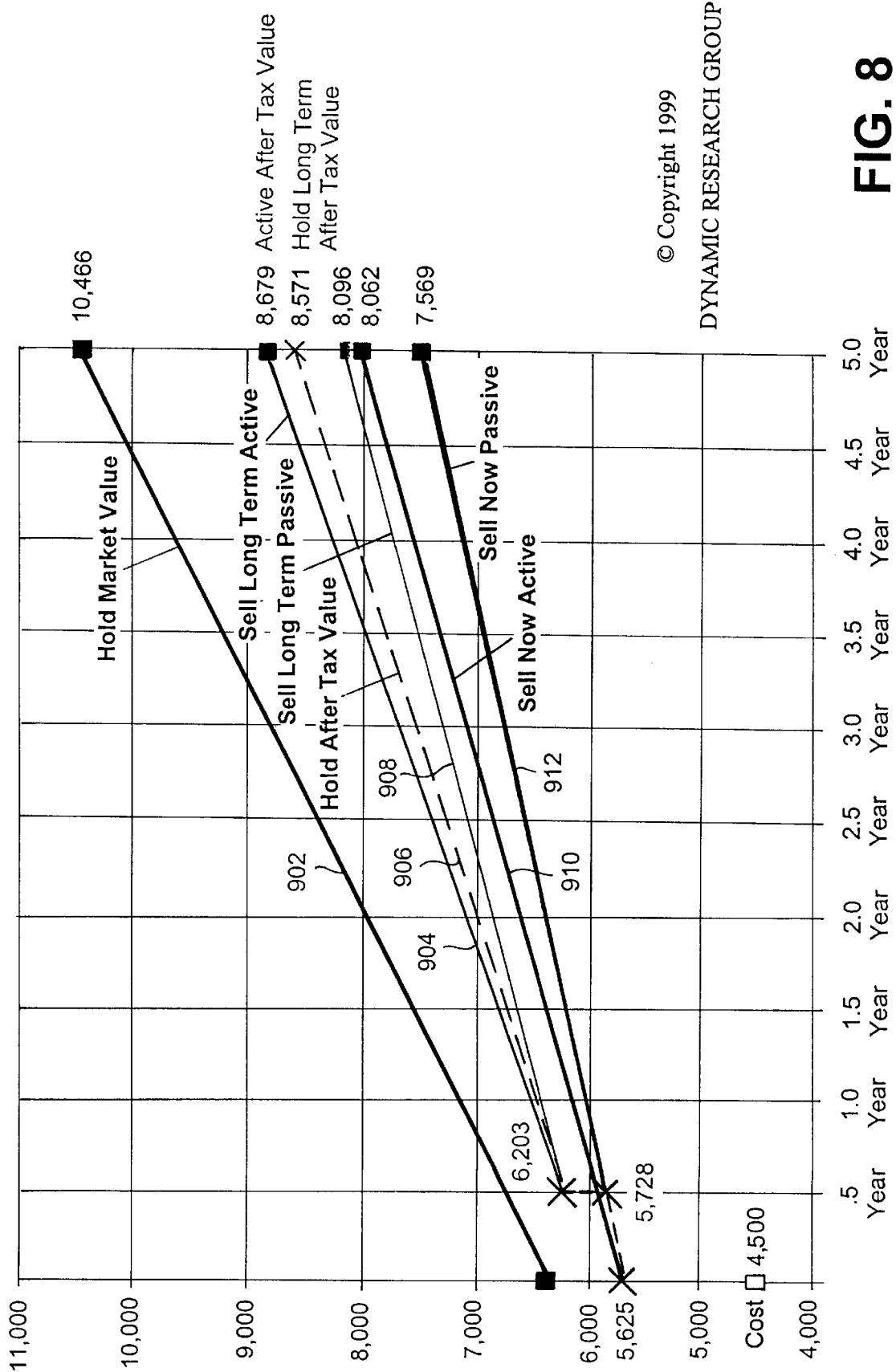
FIG. 8 shows a chart depicting results of the computerized system and method for optimizing after-tax proceeds compared with alternate investment strategies that are known in the art.

FIG. 8 shows the results of the computerized system 100 and method for optimizing after-tax proceeds compared with alternate investment strategies that are known in the art. This chart compares six investment disciplines that measure the value of the investment if: (1) held, with the proceeds computed at market value, without taxation or other costs; shown as line 902; (2) sold long-term with the proceeds taxed and re-invested in an active investment discipline, shown as line 904; (3) held, with the proceeds computed at their true after-tax value, shown as line 906; (4) sold long-term with the proceeds taxed and re-invested in a term passive investment discipline, shown as line 908; (5) sold immediately, with the proceeds re-invested in an active investment discipline, shown as line 910; and (6) sold immediately, with the proceeds re-invested in a passive investment discipline, shown as line 912. There are several key features to note about the performance of the disclosed system 100 and method of the invention. First, the market value 902 is consistently greater than the after-tax proceeds of selling the investment since there is always a tax on the proceeds. Second, after another 6 months the proceeds shown in 904–908 jump since the capital gains tax rate is effectively lowered. In the examples shown in FIG. 8, it is assumed that a lot had been purchased six months previously.

Another embodiment of the invention is as a distributed processing system on a network, such as a World Wide Web (WWW) site on the Internet. Referring to FIG. 1, this embodiment includes a user interface 102 or front-end means that is available via the Internet by a client using a browser 114, or other access methods. The user interface 102 in this embodiment allows a client to enter various data through a set of forms, which gather substantially identical information as the input windows in the spreadsheet embodiment. The front end includes a set of web-page forms which may be written in the Hyper Text Markup Language (HTML). These pages provide a description of the program inputs and gather data from users through the set of input forms. These data are then transmitted through middleware such as a Common Gateway Interface (CGI) script to the DTL processor engine or computation server 120 as shown in FIG. 1. The processor engine then evaluates a set of alternate investment strategies using the DTL process. The universe of investments 122 in this embodiment can be dynamically updated or accessed directly from the system 100. This is accomplished through processing methods and networked communications protocols that are known in the art. A set of results and recommendations are computed and transmitted back to the user through the CGI gateway where they are formatted and displayed as a customized webpage.

The DTL engine may also communicate with other databases 126 to maintain up-to-date information on all investment prices and related information. The DTL engine may also communicate with electronic brokerage systems to execute trades if desired by the user. The user data may be segregated from other data and may be saved between sessions. Thus the user data is both private and persistent. This allows each user to input fact sets regarding each lot of investment instruments they hold along with whatever investment expectations they may have available and then explore a variety of transactions based on these data.

The disclosed computerized system 100 and method optimizes after-tax proceeds using an after-tax calculation engine employing "DYNAMIC TAX LOGIC" commercially available from Dynamic Capital Management, The computerized system 100 and method accurately determines the after-tax amount of money an individual could expect to have at the end of a holding period for each of a set of investment strategies associated with a particular lot of stock held.

The disclosed computerized system 100 provides several key advantages for investors and others who are interested in optimizing after-tax return on capital investments. These include:

(1) A priori knowledge to provide the ability for investors to see the tax consequences of their investment decisions in advance;

(2) "What if" calculations allowing investors to immediately see the projected results of their transaction decisions without actually executing the trades or doing their tax returns; and (3) Self-managed expectations in which evaluation of the expected price targets or returns of an investment, either one that is currently held or an alternate that is being considered, is a subjective process that involves some risk. Therefore, it is important for users to evaluate different investment strategies under different sets of performance expectations. In the disclosed computerized system 100, expectations (such as, for example, price targets and dividend rates) are specified by the user. Users can either use expectations supplied by a fund manager or use expectations which they have determined themselves.

The computerized system 100 and method helps to produce optimal investment strategies that not only maximize profits for the individual investor but which also serves the socially useful purpose of increasing capital mobility and allocating investment capital in those areas where it is most productive, for example, where it generates the most wealth. Thus, the computerized system 100 and method mitigates real and perceived inhibitions on capital mobility that result from economic perceptions of distortions that may be caused by the lack of understanding, a priori, of the effects on wealth generation by our tax laws.

The computerized system 100 shown in FIG. 1 operating according to the method shown in FIG. 2 allows users to answer the following multi-part investment question before committing to a transaction:

At what price does it make sense to:

(1) sell an investment instrument;

(2) pay the associated capital gains tax and other fees; and (3) re-invest in another, potentially better, investment instrument?

A key variable to be determined is the holding period or investment horizon, which is arbitrarily determined by the investor. In an illustrative embodiment FIG. 6 this period may be specified to be a 36 month, a 48 month or a 60 month extended holding period, but any arbitrary period length may be programmed and used.

The application of the computerized system 100 and method involves, for example, building a set of unique assumptions, including a specific fact set such as example fact sets shown in FIGS. 3A–3D, as well as a set of expectations that are applicable to each subject lot. The fact set may include:

(1) the current market price that the subject lot could be currently sold for;

(2) the lot owner's long-term and short-term marginal rates that would be applicable to the subject lot;

(3) the number of shares included in the lot;

(4) the total cost of the lot;

(5) the number of months remaining until a held position would enter the long-term tax window, when rounded up to the longest month;

(6) an annual percentage advisor fee, if applicable, and/or an annual brokerage wrap fee, if applicable; and (7) a cents per share brokerage expense, if applicable.

The following expectation set may be used, and include:

(1) an assumption about the subject stock price at the beginning of the long-term window, and at the termination of an existing 36, 48, or 60 month investment horizon, arrived at by either assuming an earnings base, a five year earnings growth rate and PE assumption for the subject stock or a static target price for the subject stock, which may be arrived at with a static price target for the termination of either a 36, 48, or 60 month investment horizon;

(2) the dividend rate of the subject stock;

(3) the dividend growth rate of the held stock;

(4) the total before-tax-return potential from either a specific stock or an otherwise active reinvestment discipline option, assuming the various alternate re-investment options all calculate dividend rates equal to a current rate of the S&P500;

(5) the turnover assumption anticipated with any re-investment strategy;

(6) a five-year growth rate assumption for the Standard & Poor's 500 (S&P500), where a passive strategy comparison is desired;

(7) a five-year price-earnings forecast for the S&P500; and (8) an assumption as to how vulnerable to an immediate loss a specific lot might be subject to.

The computerized system 100 and method then compares the after-tax proceeds of several investment strategies to identify which is optimal from an after-tax perspective 208. The computerized system 100 and method may evaluate the following example strategies FIG. 6:

(1) purchasing a lot of a security at the currently inputted price and holding for the selected holding period;

(2) holding an existing lot position until the termination of an investment horizon;

(3) selling the lot at currently inputted prices and re-investing in another lot or otherwise in an active investment discipline for a specified investment horizon;

(4) selling the lot at currently inputted prices and re-investing in a secondary or S&P500-based passive discipline for a specified investment horizon;

(5) selling the lot at the beginning of the long-term window and re-investing in a primary or active investment discipline, for the number of months remaining after an anticipated sell, for a specified investment horizon; or (6) selling the lot at the beginning of the long-term window and re-investing in an S&P500-based passive discipline for the number of months remaining after an anticipated sell, for a specified investment horizon.

By the foregoing a novel and unobvious computerized system 100 and method has been disclosed by way of the preferred embodiment. However, numerous modifications and substitutions may be had without departing from the spirit of the invention. For example, while the preferred embodiment discusses using a computer implementing formulae in a spreadsheet, it is wholly within the purview of the invention to contemplate a database program implementing such formula and displaying such input and output windows in the manner as set forth above. Accordingly, the invention has been described by way of illustration rather than limitation.

APPENDIX A

© Copyright 1999 DYNAMIC RESEARCH OROUP

| | AL | AM |
|---|---|---|
| 490 | | 3YR |
| 491 | | =(AP608) |
| 492 | =(AN573) | =SUM(AM493:AM496) |
| 493 | =(AN574) | =IF(AL512=AL508,$AL523,0) |
| 493 | =(AN575) | =IF(AL508=AL512,$AL531,0) |
| 495 | =(AN569) | =IF(AL508=AL512,+$AM531,0) |
| 496 | =(AN570) | =IF(AL508=AL512,$AM523,0) |
| 497 | =(AN568) | |
| 498 | =(AN571) | =(AL527+AM527+AL535+AM535) |
| 499 | =(AL497+AL498) | |
| 500 | =(AN572) | |
| 501 | =(AL500*AL495) | |
| 502 | =IF(AL498<0,AL498,0) | |
| 503 | =(AL493+AL538) | |
| 504 | =IF(AL494<1,AL496,AL495) | |
| 505 | 3YR | 4YR |
| 506 | =(AO616) | =(AP616) |
| 507 | =(AO617) | =(AP617) |
| 508 | =(AO618) | =(AP618) |
| 509 | =(AO619) | =(AP619) |
| 510 | =(AO620) | =(AP620) |
| 511 | =(AO621) | =(AP621) |
| 512 | =MAX(AL507:AL510) | =MAX(AM507:AM510) |
| 513 | | |
| 514 | =(AL503/AL492) | EFFECTIVE RATE |
| 515 | =(AL492*AN557) | =IF(AN516>1,1,AN516) |
| 516 | =(AN557-AL537)/AL537 | TURNOVER |
| 517 | =IF(AL494>0,((AL515-(AL495*(AL515-AL493)))),(AL515-(AL496*(AL515-AL493)))) | LONG TERM AFTER TAX VAL |
| 518 | =IF((AN557-(AL493/AL492))<0,0,(AN557-(AL493/AL492))) | |
| 519 | | |
| 520 | 1. ST/ST | 4. LT/ST NET |
| 521 | =IF(AL497<0,AL497,0) | =IF(AL497+AL498+AL500+AM531*AL518<0,AL498+AL497+AM531*AL518+AL500,0) |
| 522 | =IF(AL494>0,(AL492*AN557)-AL493,0) | =IF(AL494<0.001,((AL492*AN557)-AL493)-AL518*AM531,0) |
| 523 | =IF(AL518=0,0,MIN(-AL521/$AL518,AL522/AL518)) | =IF(AL518=0,0,MIN(-AM521/AL518,AM522/AL518)) |
| 524 | =(AL497+(AL523*AL518)) | =(AL497)+AL518*AM523 |
| 525 | =AL498 | =(AL498+((AM531)*AL518)) |
| 526 | =(AL497+AL498+(AL523*AL518)) | =(AL497+AL498+(AM531+AM523)*AL518) |

APPENDIX A-continued

© Copyright 1999 DYNAMIC RESEARCH OROUP

| 527 | =IF(AND(AL526>0,AL524>AL525),AL495*AL526,IF(AND(AL526>0,AL525>AL524),AL496*AL526,0)) | =IF(AND(AM526>0,AM524>AM525),AL495*AM526,IF(AND(AM526>0,AM525>AM524),AL496*AM526,0)) |
|---|---|---|
| 528 | 2. ST/LT | 3. LT/LT |
| 529 | =IF(AL498<0,AL499+AL523*AL518,0) | =IF(AL498<0,AL498,0) |
| 530 | =IF(AL494>0,((AL492*AN557)-AL493)-AL523*AL518,0) | =IF(AL494<0.001,(AL492*AN557)-AL493,0) |
| 531 | =IF(AL518=0,0,MIN(-AL529/AL518,AL530/AL518)) | =IF(AL518=0,0,MIN(-AM529/AL518,AM530/AL518)) |
| 532 | =(AL497+AL518*(AL523+AL531)) | =AL497 |
| 533 | =AL498+AL518*AL531 | =(AL498+(AM531*AL518)) |
| 534 | =(AL497+AL498+(AL531*AL518)+(AL518*AL523)) | =(AL497+AL498+(AM531*AL518)) |
| 535 | =IF(AND(AL534>0,AL532>AL533),AL495*AL534,IF(AND(AL534>0,AL533>AL532),AL496*AL534,0)) | =IF(AND(AM534>0,AM532>AM533),AL495*AM534,IF(AND(AM534>0,AM533>AM532),AL496*AM534,0)) |
| 536 | | |
| 537 | =(AL493/AL492) | |
| 538 | =(AL523+AM523+AL531+AM531)*AL518 | |

| | AN | AO |
|---|---|---|
| 490 | 4YR | 5YR |
| 491 | =(AP610) | =(AP612) |
| 492 | =SUM(AN493:AN496) | =SUM(AO493:AO496) |
| 493 | =IF(AM512=AM508,$AL523,0) | =IF(AN512=AN508,$AL523,0) |
| 493 | =IF(AM508=AM512,$AL531,0) | =IF(AN508=AN512,$AL531,0) |
| 495 | =IF(AM508=AM512,+$AM531,0) | =IF(AN508=AN512,+$AM531,0) |
| 496 | =IF(AM508=AM512,$AM523,0) | =IF(AN508=AN512,$AM523,0) |
| 497 | | |
| 498 | CUR YR TAXES | |
| 499 | | |
| 500 | | |
| 501 | | |
| 502 | | |
| 503 | | |
| 504 | | |
| 505 | 5YR | |
| 506 | =(AQ616) | |
| 507 | =(AQ617) | |
| 508 | =(AQ618) | |
| 509 | =(AQ619) | |
| 510 | =(AQ620) | |
| 511 | =(AQ621) | |
| 512 | =MAX(AN507:AN510) | |
| 513 | | |
| 514 | =(AN515*AL496+(1-AN515)*AL495) | |
| 515 | =IF(AM515<0.501,1,(1-((AM515-0.5)/0.5))) | |
| 516 | =(AN562) | |
| 517 | =(C701) | |

| | AO | AP | AQ |
|---|---|---|---|
| 608 | | =(CP57) | |
| 609 | | | |
| 610 | | =(CP58) | |
| 611 | | | |
| 612 | | =(CP59) | |
| 613 | | | |
| 614 | 3YR | 4YR | 5YR |
| 615 | | | |
| 616 | =(CP60) | =(CP61) | =(CP62) |
| 617 | =(CP63) | =(CP64) | =(CP65) |
| 618 | =(CP66) | =(CP67) | =(CP68) |
| 619 | =(CP69) | =(CP70) | =(CP71) |
| 620 | =(CP72) | =(CP73) | =(CP74) |
| 621 | =(CP75) | =(CP76) | =(CP77) |

APPENDIX A-continued

© Copyright 1999 DYNAMIC RESEARCH OROUP

| | | | |
|---|---|---|---|
| 622 | | | |
| 623 | | | |
| 624 | | | |
| 625 | =(CP78) | =(CP79) | =(CP80) |
| 626 | | | |
| 627 | | | |
| 628 | | =(AP606) | |
| 629 | | | |
| 630 | | =(CP123) | |
| 631 | | | |
| 632 | | =(CP124) | |
| 633 | | | |
| 634 | | =(CP125) | |
| 635 | | | |
| 636 | 3YR | 4YR | 5YR |
| 637 | | | |
| 638 | =(CP126) | =(CP127) | =(CP128) |
| 639 | =(CP129) | =(CP130) | =(CP131) |
| 640 | =(CP132) | =(CP133) | =(CP134) |
| 641 | =(CP135) | =(CP136) | =(CP137) |
| 642 | =(CP138) | =(CP139) | =(CP140) |
| 643 | =(CP141) | =(CP142) | =(CP143) |
| 647 | =(CP144) | =(CP145) | =(CP146) |

| | AL | AM |
|---|---|---|
| 676 | =($AN$582+$AN$583) | =($AN$582+$AN$583) |
| 677 | =(AL679+AL678) | =(AM679+AM678) |
| 678 | =($CP$55) | =($CP$55) |
| 679 | =(AL747) | =(AM747) |
| 680 | =(AL683) | =($AN$576) |
| 681 | | |
| 682 | | |
| 683 | =($AN$573*$B$2) | =($AN$573*$B$2) |
| 684 | =(AL683) | =(AM683−(AM683−AM680)*$CP$56) |
| 685 | | |
| 686 | =(AL684*AL679) | =(AM683*AM679) |
| 687 | 0 | 0 |
| 688 | =(AL684*AL678) | =(AM683*AM678) |
| 689 | 0 | 0 |
| 690 | =(AL688*$AN$569) | =(AM688*$AN$569) |
| 691 | =(AL683*AL676) | =(AM683*AM676) |
| 692 | =($AN$584*$AN$573) | 0 |
| 693 | =(AL683+AL686+AL688−AL689−AL690−AL691−AL692) | =(AM683+AM686+AM688−AM689−AM690−AM691−AM692) |
| 694 | =(AL693*AL679) | =(AM693*AM679) |
| 695 | 0 | 0 |
| 696 | =(1+$F$18)*AL688 | =(1+$F$18)*AM688 |
| 697 | 0 | 0 |
| 698 | =(AL696*$AN$569) | =(AM696*$AN$569) |
| 699 | =(AL693*AL676) | =(AM693*AM676) |
| 700 | 0 | 0 |
| 701 | =(AL693+AL694+AL696−AL697−AL698−AL699−AL700) | =(AM693+AM694+AM696−AM697−AM698−AM699−AM700) |
| 702 | =(AL701*AL679) | =(AM701*AM679) |
| 703 | 0 | 0 |
| 704 | =(1+$F$18)*AL696 | =(1+$F$18)*AM696 |
| 705 | 0 | 0 |
| 706 | =(AL704*$AN$569) | =(AM704*$AN$569) |
| 707 | =(AL701*AL676) | =(AM701*AM676) |
| 708 | 0 | 0 |
| 709 | =(AL701+AL702+AL704−AL705−AL706−AL707−AL708) | =(AM701+AM702+AM704−AM705−AM706−AM707−AM708) |
| 710 | =(AL709*AL679) | =(AM709*AM679) |
| 711 | 0 | 0 |
| 712 | =(1+$F$18)*AL704 | =(1+$F$18)*AM704 |
| 713 | 0 | 0 |
| 714 | =(AL712*$AN$569) | =(AM712*$AN$569) |
| 715 | =(AL709*AL676) | =(AM709*AM676) |
| 716 | 0 | 0 |
| 717 | =(AL709+AL710+AL712−AL713−AL714−AL715−AL716) | =(AM709+AM710+AM712−AM713−AM714−AM715−AM716) |
| 718 | =(AL717*AL$679) | =(AM717*AM679) |
| 719 | =(AL$728*$AN$573)−AL$683−AL$692 | =(AM728*$AN$573)−AM680−($AN$573*$AN$584) |
| 720 | =(1+$F$18)*AL712 | =(1+$F$18)*AM712 |
| 721 | =(AL719*$AN$570) | =(AM719*$AN$570) |
| 722 | =(AL720*$AN$569) | =(AM720*$AN$569) |
| 723 | =(AL717*AL$676) | =(AM717*AM676) |
| 724 | =(AL$692) | =($AN$584*$AN$573) |
| 725 | =(AL717+AL718+AL720−AL721−AL722−AL723−AL724) | =(AM717+AM718+AM720−AM721−AM722−AM723−AM724) |

| | AO | AP |
|---|---|---|
| 676 | =($AN$582+$AN$583) | =($AN$582+$AN$583) |
| 677 | =(AO679+AO678) | =(AP679+AP678) |
| 678 | =($AN$595) | =($AN$595) |
| 679 | =($AN$577−AO678) | =(AR857) |
| 680 | =($AN$576) | =($AN$576) |
| 681 | | |
| 682 | | |
| 683 | =($AN$573*$B$2) | =($AN$573*$B$2) |
| 684 | =(AO683−(AO683−AO680)*$CP$56) | =(AP683−(AP683−AP680)*$CP$56) |
| 685 | | |
| 686 | =(AO684*AO679) | =(AP684*AP679) |
| 687 | =IF($AN$562>0.999,AO686,$AN$562*AO686) | 0 |
| 688 | =(AO684*AO678) | =(AP684*AP678) |
| 689 | =($AN$569*AO687) | 0 |
| 690 | =(AO688*$AN$569) | =(AP688*$AN$569) |
| 691 | =(AO684*AO676) | =(AP684*AP676) |
| 692 | =($AN$562*2*$AN$584*$AN$573) | 0 |
| 693 | =(AO684+AO686+AO688−AO689−AO690−AO691−AO692) | =(AP684+AP686+AP688−AP689−AP690−AP691−AP692) |
| 694 | =(AO693*AO679) | =(AP693*AP679) |
| 695 | =IF($AN$562>0.999,AO694,$AN$562*(AO694+AO686−AO687)) | 0 |
| 696 | =(AO693*AO$678) | =(AP678)*AP693 |
| 697 | =($CP$54*AO695) | 0 |
| 698 | =(AO696*$AN$569) | =(AP696*$AN$569) |
| 699 | =(AO693*AO676) | =(AP693*AP676) |
| 700 | =($AN$562*2*$AN$584*$AN$573) | 0 |
| 701 | =(AO693+AO694+AO696−AO697−AO698−AO699−AO700) | =(AP693+AP694+AP696−AP697−AP698−AP699−AP700) |
| 702 | =(AO701*AO679) | =(AP701*AP679) |
| 703 | =IF($AN$562>0.999,AO702,$AN$562*(AO702+AO694−AO695+AO686−AO687)) | 0 |
| 704 | =(AO701*AO$678) | =(AP701*AP$678) |
| 705 | =($CP$54*AO703) | 0 |
| 706 | =(AO704*$AN$569) | =(AP704*$AN$569) |
| 707 | =(AO701*AO676) | =(AP701*AP676) |
| 708 | =($AN$562*2*$AN$584*$AN$573) | 0 |
| 709 | =(AO701+AO702+AO704−AO705−AO706−AO707−AO708) | =(AP701+AP702+AP704−AP705−AP706−AP707−AP708) |
| 710 | =(AO709*AO679) | =(AP709*AP679) |
| 711 | =IF($AN$562>0.999,AO710,$AN$562*(AO710+AO694−5AO695+AO686−AO687+AO702−AO703)) | 0 |
| 712 | =(AO709*AO$678) | =(AP709*AP$678) |
| 713 | =($CP$54*AO711) | 0 |
| 714 | =(A0712*$AN$569) | =(AP712*$AN$569) |
| 715 | =(AO709*AO676) | =(AP709*AP676) |
| 716 | =($AN$562*2*$AN$584*$AN$573) | =($AN$562*2*$AN$584*$AN$573) |
| 717 | =(AO709+AO710+AO712−AO713−AO714−AO715−AO716) | =(AP709+AP710+AP712−AP713−AP714−AP715−AP716) |

APPENDIX A-continued

© Copyright 1999 DYNAMIC RESEARCH OROUP

| | | | |
|---|---|---|---|
| 718 | =(AO717*AO679) | | =(AP717*AP679) |
| 719 | =IF($AN$562>0.999,AO718, AO718+AO694−AO695+ AO686−AO687+AO702− AO703+AO710−AO711) | | =(AP686+AP694+AP702+ AP710+AP718) |
| 720 | =(AO717*AO$678) | | =(AP717*AP$678) |
| 721 | =($CP$54*AO719) | | =(AP719)*AN$570 |
| 722 | =(AO720*$AN$569) | | =(AP720*$AN$569) |
| 723 | =(AO717*AO676) | | =(AP717*AP676) |
| 724 | =($AN$562*2*$AN$584* $AN$573) | | =($AN$562*2*$AN$584* $AN$573) |
| 725 | =(AO717+AO718+AO720− AO721−AO722−AO723− AO724) | | =(AP717+AP718+AP720− AP721−AP722−AP723− AP724) |

| | AQ | AR |
|---|---|---|
| 676 | =($AN$582+$AN$583) | =($AN$582+$AN$583) |
| 677 | =(AQ679+AQ678) | =(AR679+AR678) |
| 678 | =(AO678) | =(AP678) |
| 679 | =($AN$577−AQ678) | =(AR857) |
| 680 | =($AN$576) | =($AN$576) |
| 681 | | |
| 682 | | |
| 683 | =($AN$573*$B$2) | =($AN$573*$B$2) |
| 684 | =(AQ683−(AQ683−AQ680)* $CP$56) | =(AR683−(AR683−AR680)* $CP$56) |
| 685 | | |
| 686 | =(C695+C696) | =(I695+I696) |
| 687 | =(C698+C699) | =(I698) |
| 688 | =($C$693/12)*$CP$55*AQ683+ ((12−$C$693)/12)*$AN$595* ($C694−(C698*AN570)) | =(AQ688) |
| 689 | =($AN$570*C698)+(CP54* C699) | =($AN$570*AR687) |
| 690 | =(AQ688*$AN$569) | =(AR688*$AN$569) |
| 691 | =(AQ683*AQ676) | =(AR683*AR676) |
| 692 | =($AN$573*2*$AN$584) | 0 |
| 693 | =(AQ683+AQ686+AQ688− AQ689−AQ690−AQ691− AQ692) | =(AR683+AR686+AR688− AR689−AR690−AR691− AR692) |
| 694 | =(AQ693*AQ679) | =(AR693*AR679) |
| 695 | =IF($AN$562>0.999,AQ694, $AN$562*(AQ694+C696− C699)) | 0 |
| 696 | =(AQ678)*AQ693 | =(AR678)*AR693 |
| 697 | =($CP$54*AQ695) | 0 |
| 698 | =(AQ696*$AN$569) | =(AR696*$AN$569) |
| 699 | =(AQ693*AQ676) | =(AR693*AR676) |
| 700 | =($AN$562*2*$AN$584* $AN$573) | 0 |
| 701 | =(AQ693+AQ694+AQ696− AQ697−AQ698−AQ699− AQ700) | =(AR693+AR694+AR696− AR697−AR698−AR699− AR700) |
| 702 | =(AQ701*AQ679) | =(AR701*AR679) |
| 703 | =IF($AN$562>0.999,AQ702, $AN$562*(AQ702+AQ694+ C696−AQ695−C699)) | 0 |
| 704 | =(AQ701*AQ$678) | =(AR701*AR$678) |
| 705 | =($CP$54*AQ703) | 0 |
| 706 | =(AQ704*$AN$569) | =(AR704*$AN$569) |
| 707 | =(AQ701*AQ676) | =(AR701*AR676) |
| 708 | =($AN$562*2*$AN$584* $AN$573) | 0 |
| 709 | =(AQ701+AQ702+AQ704− AQ705−AQ706−AQ707− AQ708) | =(AR701+AR702+AR704− AR705−AR706−AR707− AR708) |
| 710 | =(AQ709*AQ679) | =(AR709*AR679) |
| 711 | =IF($AN$562>0.999,AQ710, $AN$562*(AQ710+AQ702+ AQ694+C696−AQ703−AQ695− C699)) | 0 |
| 712 | =(AQ709*AQ$678) | =(AR709*AR$678) |
| 713 | =($CP$54*AQ711) | 0 |
| 714 | =(AQ712*$AN$569) | =(AR712*$AN$569) |
| 715 | =(AQ709*AQ676) | =(AR709*AR676) |
| 716 | =($AN$562*2*$AN$584* $AN$573) | 0 |
| 717 | =(AQ709+AQ710+AQ712− AQ713−AQ714−AQ715− AQ716) | =(AR709+AR710+AR712− AR713−AR714−AR715− AR716) |
| 718 | =(AQ717*AQ679) | =(AR717*AR679) |
| 719 | =IF($AN$562>0.999,AQ718, (AQ718+AQ710+AQ702+ AQ694+C696−AQ711−AQ703− AQ695−C699)) | =(AR686+AR694+AR702+ AR710+AR718) |
| 720 | =(AQ717*AQ$678) | =(AR717*AR$678) |
| 721 | =($CP$54*AQ719) | =(AR719)*AN$570 |
| 722 | =(AQ720*$AN$569) | =(AR720*$AN$569) |
| 723 | =(AQ717*AQ676) | =(AR717*AR676) |
| 724 | =($AN$562*2*$AN$584* $AN$573) | 0 |
| 725 | =(AQ717+AQ718+AQ720− AQ721−AQ722−AQ723− AQ724) | =(AR717+AR718+AR720− AR721−AR722−AR723− AR724) |

What is claimed is:

1. A computerized method for optimizing investments on a lot-by-lot basis, the method comprising the steps of;

receiving tax and investment data corresponding to a plurality of individual lots of investments, and receiving either user-customized investment expectations or financial adviser-based investment expectations at a processor;

performing tax loss harvesting analysis on the user-customized investment expectations or the financial adviser-based investment expectations over a dynamic taxation time range by optimizing the after-tax proceeds of tax loss-based sales on a lot-by-lot basis using a predetermined software program executed by the processor;

performing comparative pro-forma tax sensitivity analysis of the tax and investment data and the analyzed investment expectations on a lot-by-lot basis using the predetermined software program executed by the processor; and determining and outputting from the processor to an output device a set of financial investment data, including money valuations, representing an optimal after-tax investment strategy path from a plurality of investment strategy paths over the dynamic taxation time range using the predetermined software program to optimize the after-tax proceeds on a lot-by-lot basis from the plurality of investment strategies, wherein the outputted optimal after-tax investment strategy path advises a user of optimal investments to be made.

2. The computerized method of claim 1, wherein the predetermined software program is a spreadsheet program.

3. The computerized method of claim 2, wherein the tax loss harvesting analysis, the comparative pro-forma tax sensitivity analysis, and the determination of the optimal after-tax investment strategy path are performed by a plurality of predetermined formula executed by the spreadsheet program.

4. The computerized method of claim 3, wherein the spreadsheet program is a "LOTUS 1-2-3"-based spreadsheet program available from "LOTUS CORPORATION".

5. The computerized method of claim 1, wherein the step of receiving tax and investment data, user-customized investment expectations, and financial adviser-based investment expectations includes the step of:

receiving the tax and investment data, the user-customized investment expectations, and the financial adviser-based expectations at the processor through an input window displayed on a user interface.

6. The computerized method of claim 5, wherein the software program includes a spreadsheet program for generating a spreadsheet grid including a plurality of cells on the user interface; and wherein the tax and investment data, the user-customized investment expectations, and the financial adviser-based expectations are received by the processor through data entry into predetermined cells of the spreadsheet grid.

7. The computerized method of claim 5, wherein the software program includes a graphic user interface (GUI) program for generating at least one data entry window as the input window.

8. The computerized method of claim 5, wherein the software program includes a browser for generating at least one network-based data entry window as the input window.

9. The computerized method of claim 5, wherein the processor includes a computation server for performing the tax loss harvesting analysis, the comparative pro-forma tax sensitivity analysis, and the determination of the optimal after-tax investment strategy path.

10. The computerized method of claim 9, wherein the user interface includes a browser for interfacing with the computation server through the Internet.

11. The computerized method of claim 9, wherein the user interface includes a browser for interfacing with the computation server through an intranet.

12. A system for optimizing after-tax proceeds of a plurality of investments on a lot-by-lot basis the system comprising:

a user interface for receiving tax and investment data corresponding to a plurality of individual lots of investments, and receiving either user-customized investment expectations or financial adviser-based investment expectations; and a processor executing a predetermined software program for processing the tax and investment data and either the user-customized investment expectations or the financial adviser-based investment expectations; performing tax loss harvesting analysis on the user-customized investment expectations or the financial adviser-based investment expectations over a dynamic taxation time range by optimizing the after-tax proceeds of tax loss-based sales on a lot-by-lot basis using the predetermined software program; for performing comparative pro-forma tax sensitivity analysis of the tax and investment data and the analyzed investment expectations on a lot-by-lot basis using the predetermined software program; and for determining and outputting from the processor to an output device a set of financial investment data, including money valuations, representing an optimal after-tax investment strategy path from a plurality of investment strategy paths over the dynamic taxation time range using the predetermined software program to optimize the after-tax proceeds on a lot-by-lot basis from the plurality of investment strategies, wherein the outputted optimal after-tax investment strategy path advises a user of optimal investments to be made.

13. The system of claim 12, wherein the predetermined software program is a spreadsheet program.

14. The system of claim 13, wherein the tax loss harvesting analysis, the comparative pro-forma tax sensitivity analysis, and the determination of the optimal after-tax investment strategy path are performed by a plurality of predetermined formula executed by the spreadsheet program.

15. The system of claim 14, wherein the spreadsheet program is a "LOTUS 1-2-3"-based spreadsheet program available from "LOTUS CORPORATION".

16. The system of claim 12, wherein the step of receiving tax and investment data, user-customized investment expectations, and financial adviser-based investment expectations includes the step of:

receiving the tax and investment data, the user-customized investment expectations, and the financial adviser-based expectations at the processor through an input window displayed on a user interface.

17. The system of claim 16, wherein the software program includes a spreadsheet program for generating a spreadsheet grid including a plurality of cells on the user interface; and wherein the tax and investment data, the user-customized investment expectations, and the financial adviser-based expectations are received by the processor through data entry into predetermined cells of the spreadsheet grid.

18. The system of claim 16, wherein the software program includes a browser for generating at least one network-based data entry window as the input window.

19. The system of claim 16, wherein the processor includes a computation server for performing the tax loss harvesting analysis, the comparative pro-forma tax sensitivity analysis, and the determination of the optimal after-tax investment strategy path.

20. The system of claim 19, wherein the user interface includes a browser for interfacing with the computation server through the Internet.

21. A system for optimizing after-tax proceeds of a plurality of investments on a lot-by-lot basis, the system comprising:

a user interface for receiving tax and investment data corresponding to a plurality of individual lots of investments, and receiving either user-customized investment expectations or financial adviser-based investment expectations; and a processor executing a software program and including:

means for processing the tax and investment data and either the user-customized investment expectations or the financial adviser-based investment expectations; performing tax loss harvesting analysis on the user-customized investment expectations or the financial adviser-based investment expectations over a dynamic taxation time range by optimizing the after-tax proceeds of tax loss-based sales on a lot-by-lot basis using a predetermined software program;

means for performing comparative pro-forma tax sensitivity analysis of the tax and investment data and the analyzed investment expectations on a lot-by-lot basis using the predetermined software program; and means for determining and outputting from the processor to an output device a set of financial investment data, including money valuations, representing an optimal after-tax investment strategy path from a plurality of investment strategy paths over the dynamic taxation time range using the predetermined software program to optimize the after-tax proceeds on a lot-by-lot basis from the plurality of investment strategies, wherein the outputted optimal after-tax investment strategy path advises a user of optimal investments to be made.

22. The system of claim 21, wherein the software program includes a spreadsheet program for executing a plurality of predetermined formula implementing the processing means, the performing means, and the determining means of the processor.

23. A computer-readable medium for use in a computer to optimize after-tax proceeds of investments on a lot-by-lot basis the computer read-able medium storing a predetermined software program implementing a method comprising the steps of receiving tax and investment data corresponding to a plurality of individual lots of investments, and receiving either user-customized investment expectations or financial adviser-based investment expectations at a processor of the computer; performing tax loss harvesting analysis on the user-customized investment expectations or the financial adviser-based investment expectations over a dynamic taxation time range by optimizing the after-tax proceeds of tax loss-based sales on a lot-by-lot basis using a predetermined software program executed by the processor;

performing comparative pro-forma tax sensitivity analysis of the tax and investment data and the analyzed investment expectations on a lot-by-lot basis using the predetermined software program executed by the processor; and determining and outputting from the processor to an output device a set of financial investment data, including money valuations, representing an optimal after-tax investment strategy path from a plurality of investment strategy paths over the dynamic taxation time range using the predetermined software program to optimize the after-tax proceeds on a lot-by-lot basis from the plurality of investment strategies, wherein the outputted optimal after-tax investment strategy path advises a user of optimal investments to be made.

24. The computer-readable medium of claim 23, wherein the predetermined software program is a spreadsheet program.

25. The computer-readable medium of claim 24, wherein the tax loss harvesting analysis, the comparative pro-forma tax sensitivity analysis, and the determination of the optimal after-tax investment strategy path are performed by a plurality of predetermined formula executed by the spreadsheet program.

26. The computer-readable medium of claim 25, wherein the spreadsheet program is a "LOTUS 1-2-3"-based spreadsheet program available from "LOTUS CORPORATION".

* * * * *